(12) United States Patent
Park et al.

(10) Patent No.: US 10,673,665 B2
(45) Date of Patent: Jun. 2, 2020

(54) TRANSMITTING AND RECEIVING DEVICE AND METHOD IN WIRELESS COMMUNICATION SYSTEM

(71) Applicant: LG ELECTRONICS INC., Seoul (KR)

(72) Inventors: Eunsung Park, Seoul (KR); Wookbong Lee, Seoul (KR); Jinsoo Choi, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/327,365

(22) PCT Filed: Aug. 4, 2015

(86) PCT No.: PCT/KR2015/008125
§ 371 (c)(1),
(2) Date: Jan. 18, 2017

(87) PCT Pub. No.: WO2016/137064
PCT Pub. Date: Sep. 1, 2016

(65) Prior Publication Data
US 2017/0180174 A1 Jun. 22, 2017

Related U.S. Application Data

(60) Provisional application No. 62/119,267, filed on Feb. 23, 2015.

(51) Int. Cl.
*H04W 84/12* (2009.01)
*H04W 72/04* (2009.01)
(Continued)

(52) U.S. Cl.
CPC .............. *H04L 27/26* (2013.01); *H04L 1/004* (2013.01); *H04L 1/0023* (2013.01);
(Continued)

(58) Field of Classification Search
None
See application file for complete search history.

(56) References Cited

U.S. PATENT DOCUMENTS 9,350,450 B2 * 5/2016 Chen ................... H04B 10/2507
2006/0146920 A1 * 7/2006 Suh ....................... H04L 5/0046
375/221

(Continued)

FOREIGN PATENT DOCUMENTS

CN 102835061 12/2012
CN 102959893 3/2013
(Continued)

OTHER PUBLICATIONS

Japan Patent Office Application No. 2017-504372, Office Action dated Dec. 12, 2017, 3 pages.
(Continued)

*Primary Examiner* — Angel T Brockman
(74) *Attorney, Agent, or Firm* — Lee Hong Degerman Kang Waimey

(57) ABSTRACT

Disclosed is a method for a station (STA) device transmitting data in a wireless local area network (WLAN) system. The method for transmitting data, according to one embodiment of the present invention, comprises the steps of: FEC encoding transmission data; constellation mapping the transmission data; inserting a pilot tone in the transmission data; performing Inverse Discrete Fourier Transform (IDFT) on the transmission data; and upconverting the transmission data and transmitting a transmission signal, wherein, if an Orthogonal Frequency Division Multiple Access (OFDMA)
(Continued)

scheme is applied to the transmission signal, the transmission signal comprises at least one tone unit which is the unit of subcarrier allocation of the OFDMA scheme.

12 Claims, 17 Drawing Sheets

(51) Int. Cl.
*H04L 27/26* (2006.01)
*H04L 5/00* (2006.01)
*H04L 1/00* (2006.01)

(52) U.S. Cl.
CPC .......... *H04L 1/0075* (2013.01); *H04L 1/0079* (2013.01); *H04L 5/0007* (2013.01); *H04L 5/0048* (2013.01); *H04L 5/0064* (2013.01); *H04L 27/2611* (2013.01); *H04L 27/2613* (2013.01); *H04W 72/0446* (2013.01); *H04W 84/12* (2013.01)

(56) References Cited

U.S. PATENT DOCUMENTS

| | | | |
|---|---|---|---|
| 2007/0147226 A1* | 6/2007 | Khandekar | H04L 5/0044 370/208 |
| 2010/0260159 A1 | 10/2010 | Zhang et al. | |
| 2012/0201316 A1* | 8/2012 | Zhang | H04L 1/0046 375/260 |
| 2012/0269142 A1 | 10/2012 | Porat et al. | |
| 2013/0202001 A1 | 8/2013 | Zhang | |
| 2013/0266086 A1 | 10/2013 | Yang et al. | |
| 2013/0315163 A1 | 11/2013 | Zhang et al. | |
| 2014/0205029 A1 | 7/2014 | Srinivasa et al. | |
| 2016/0036613 A1* | 2/2016 | Mun | H04L 1/00 714/776 |
| 2017/0214561 A1* | 7/2017 | Lee | H04L 27/263 |

FOREIGN PATENT DOCUMENTS

| | | |
|---|---|---|
| CN | 103947143 | 7/2014 |
| JP | 2014523152 | 9/2014 |
| WO | 2013147413 | 10/2013 |
| WO | 2015061729 | 4/2015 |
| WO | 2016081378 | 5/2016 |

OTHER PUBLICATIONS

PCT International Application No. PCT/KR20151008125, International Search Report dated Jan. 27, 2016, 3 pages.
European Patent Office Application Serial No. 15883452.3, Search Report dated Oct. 4, 2018, 19 pages.
Azizi, S. et al., "OFDMA Numerology and Structure", doc.: IEEE 802.11-15/0330r1, Mar. 2015, XP068082961, 38 pages.
Choi, J. et al., "Envisioning 11ax PHY Structure—Part I", doc.: IEEE 11-14/0804r1, Jul. 2014, XP055229337, 11 pages.
State Intellectual Property Office of the People's Republic of China Application Serial No. 201580024077.5, Office Action dated Dec. 5, 2018, 12 pages.

* cited by examiner

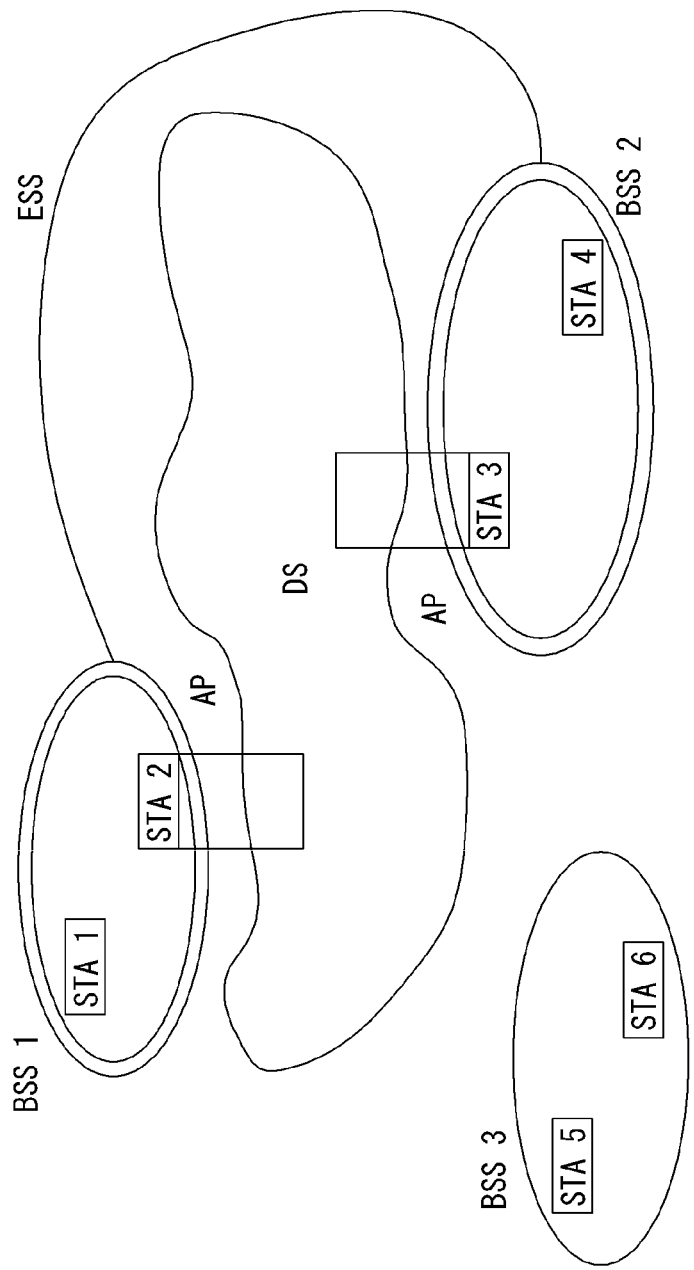
[Figure 1]
802.11 Components

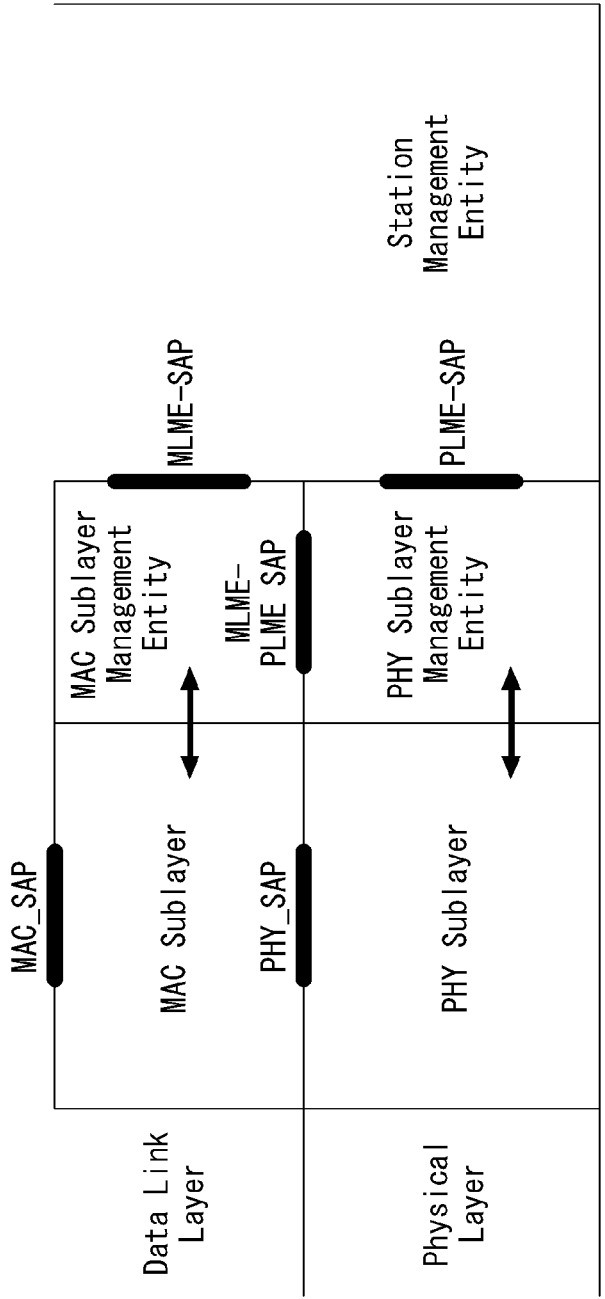

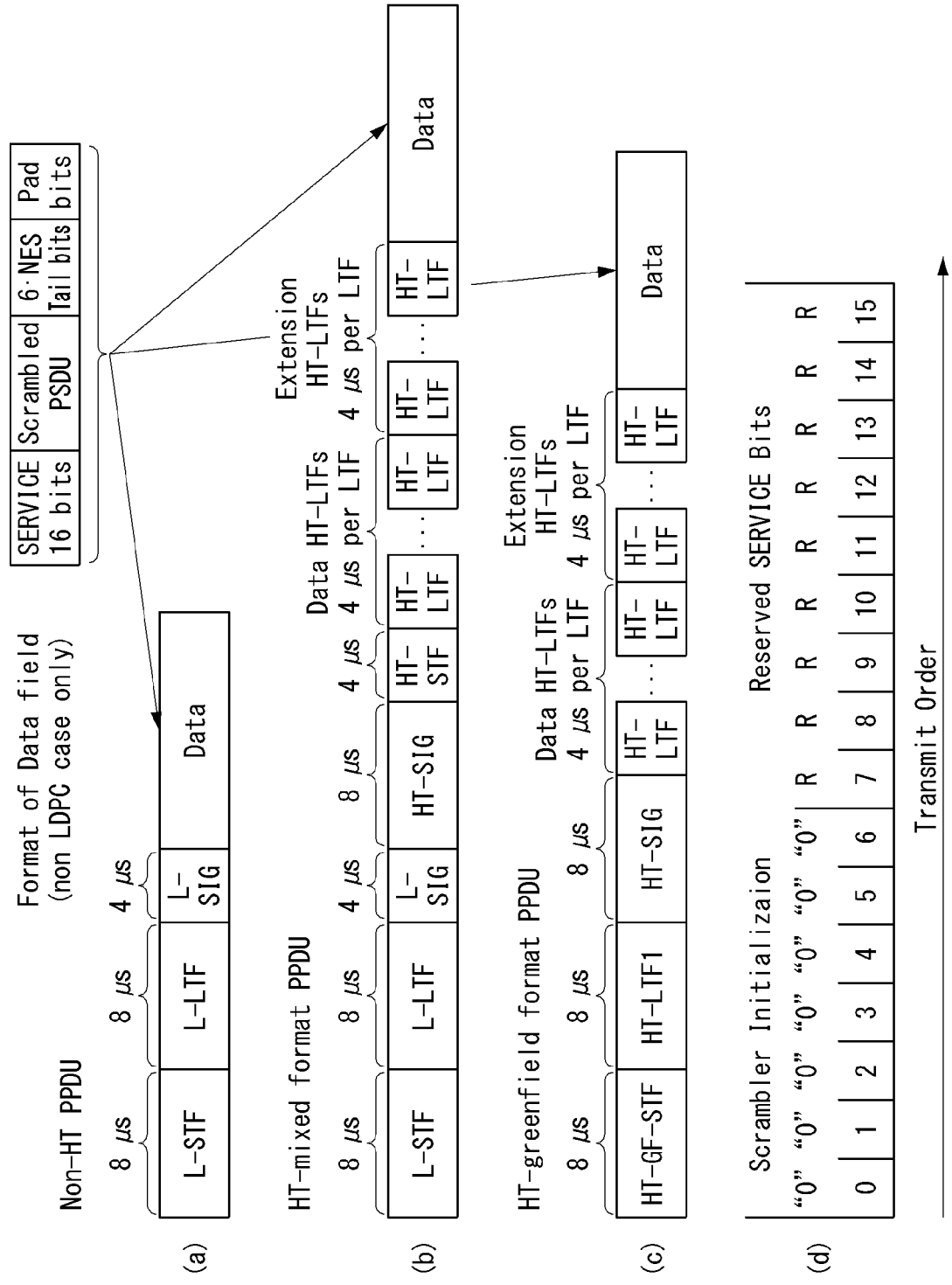

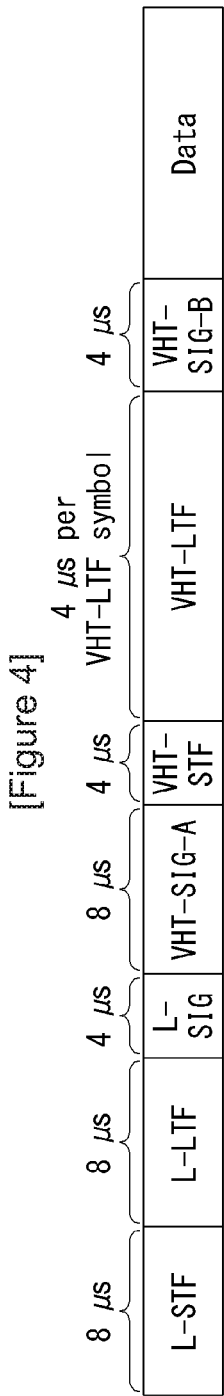

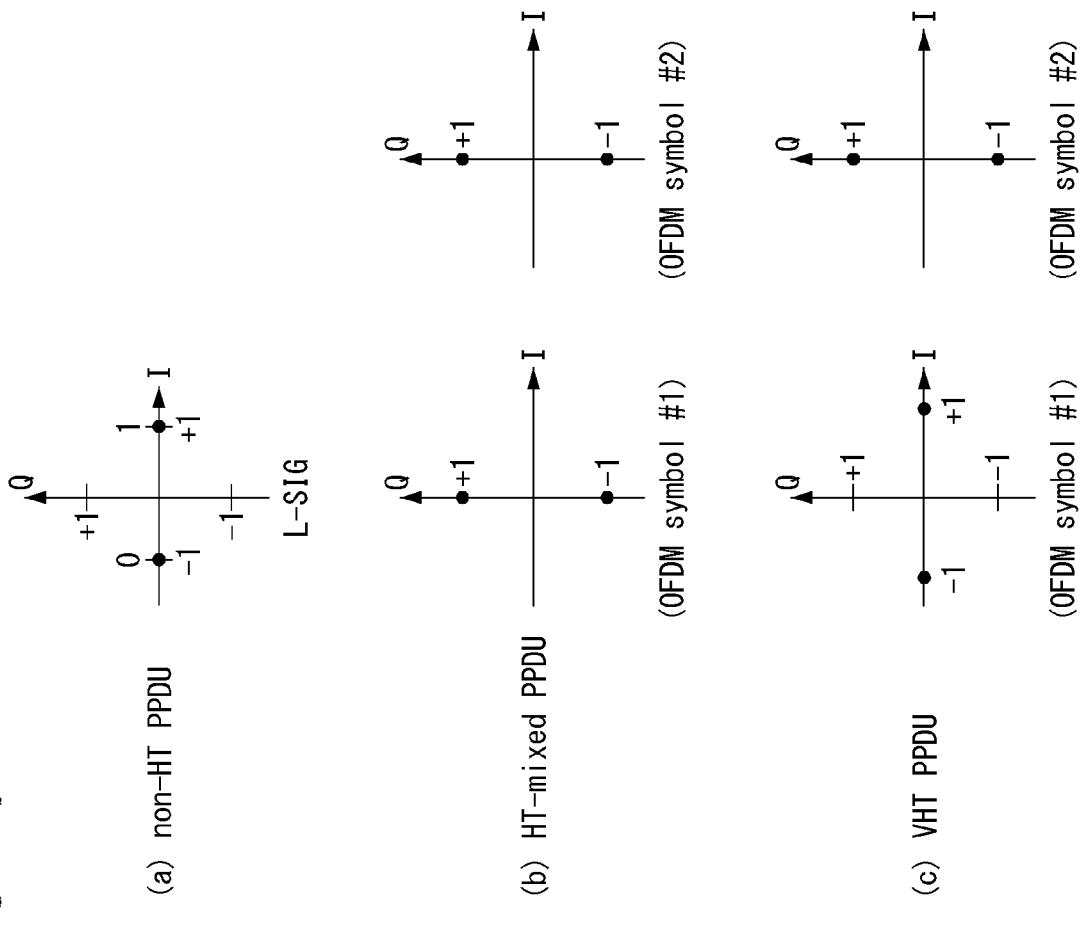

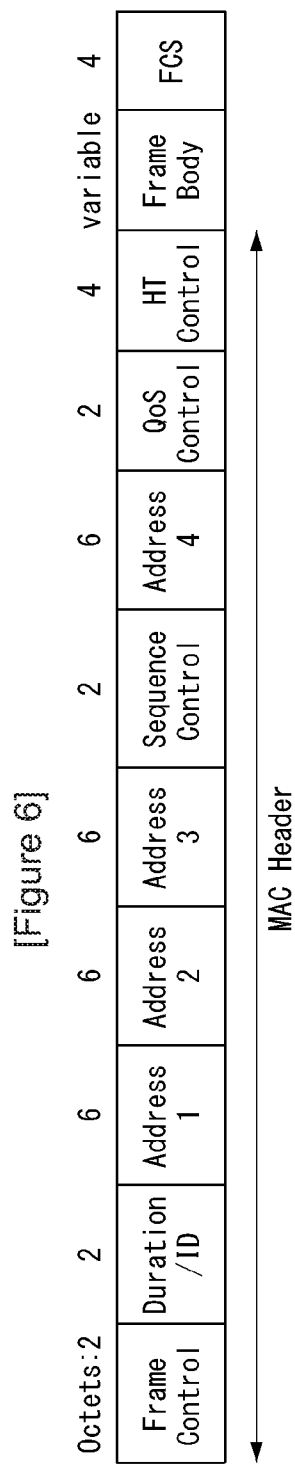
[Figure 6]

[Figure 7]

| B0 B1 | B2 B3 | B4 B7 | B8 | B9 | B10 | B11 | B12 | B13 | B14 | B15 |
|---|---|---|---|---|---|---|---|---|---|---|
| Protocol Version | Type | Subtype | To DS | From DS | More Frag- ments | Retry | Power Management | More Data | Protected Frame | Order |
| 2 | 2 | 4 | 1 | 1 | 1 | 1 | 1 | 1 | 1 | 1 |

Bits:

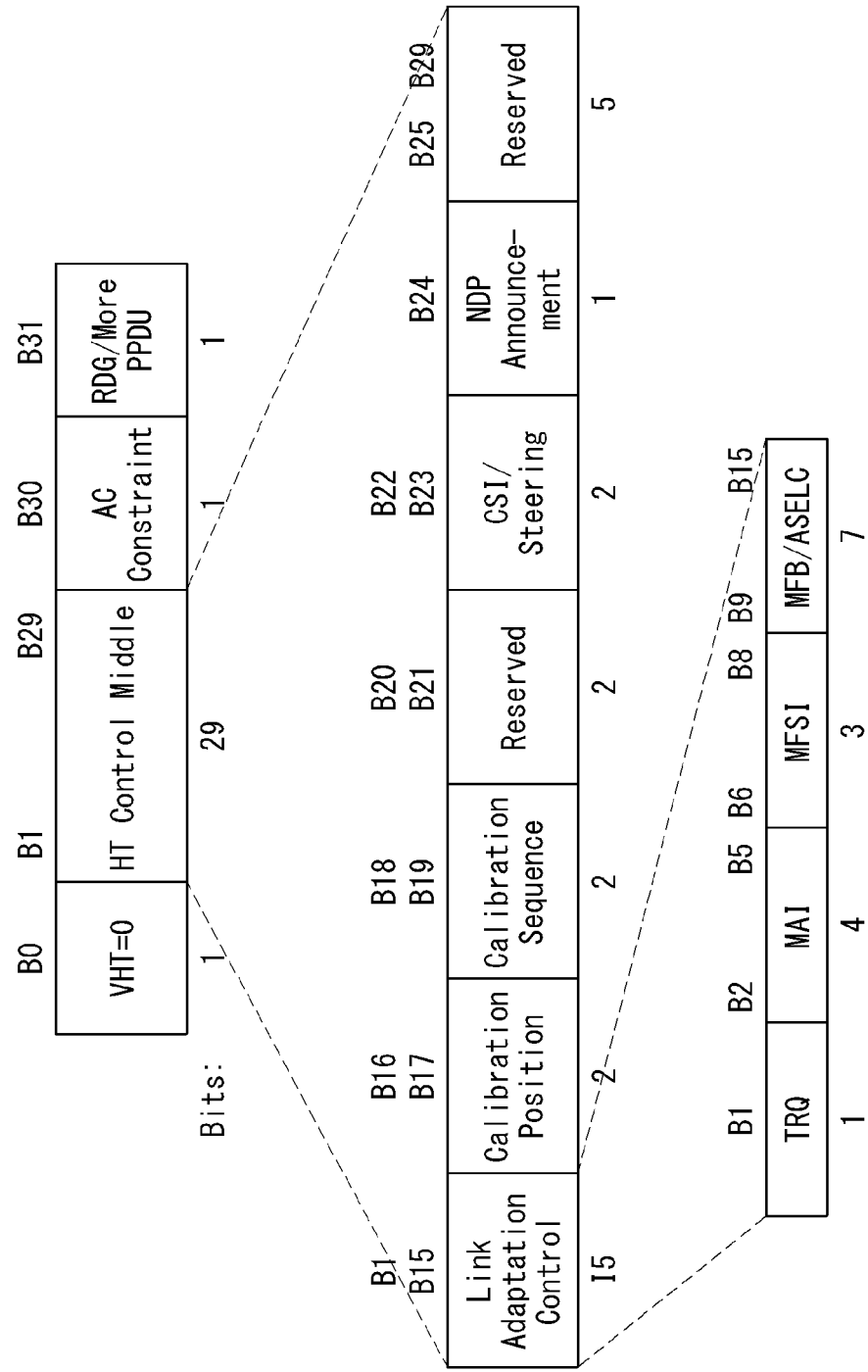

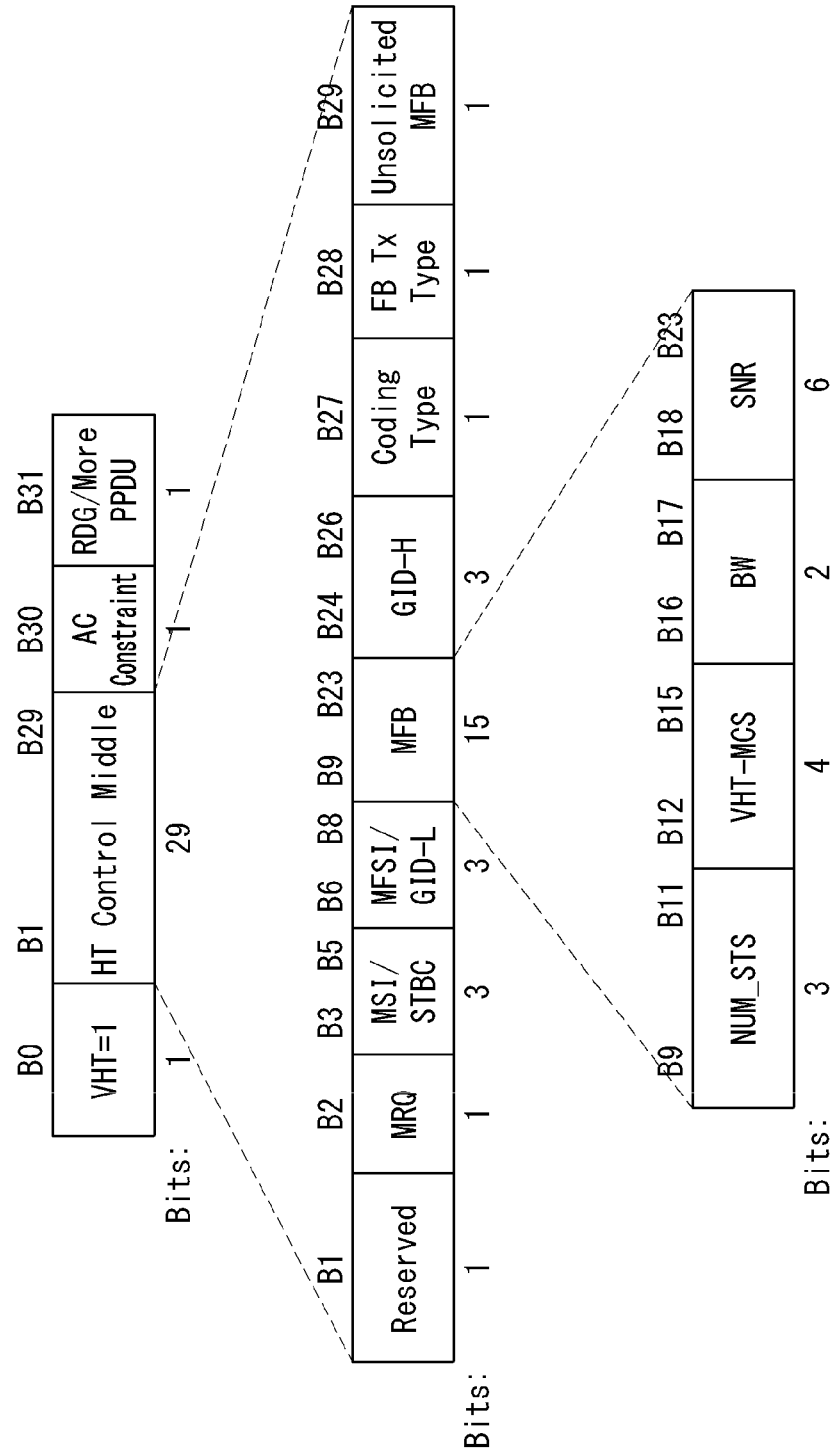
[Figure 9]

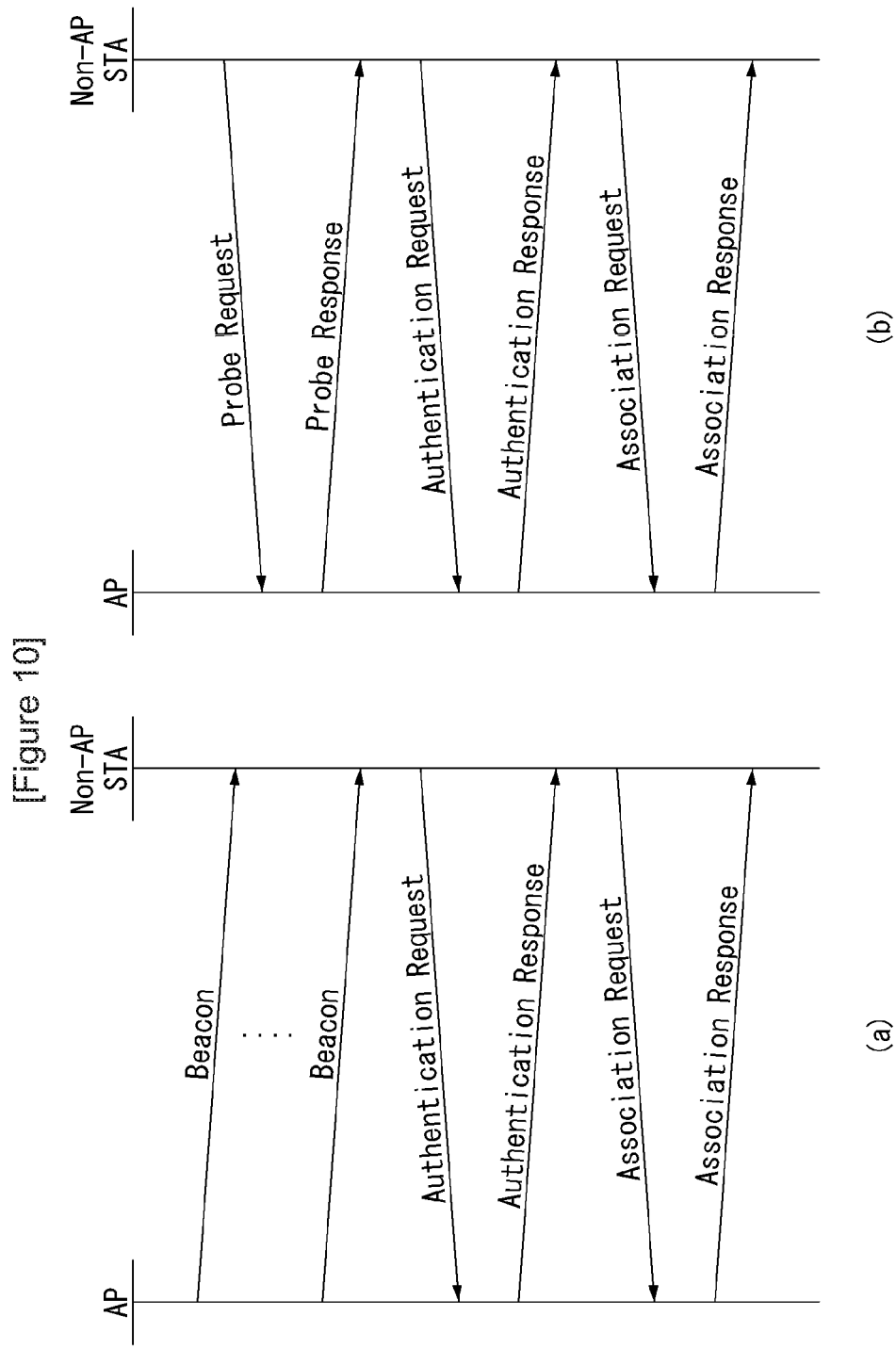
[Figure 10]

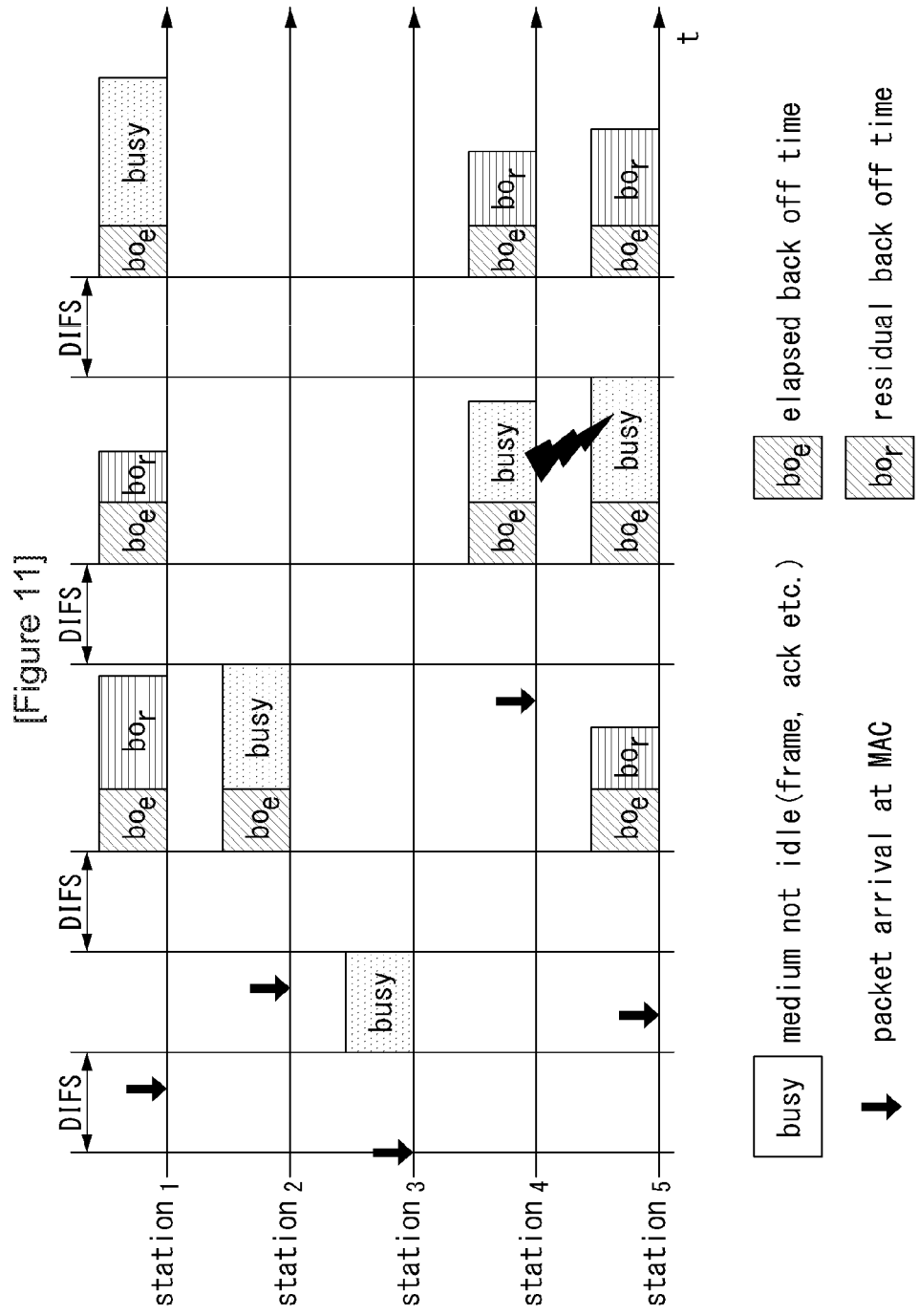

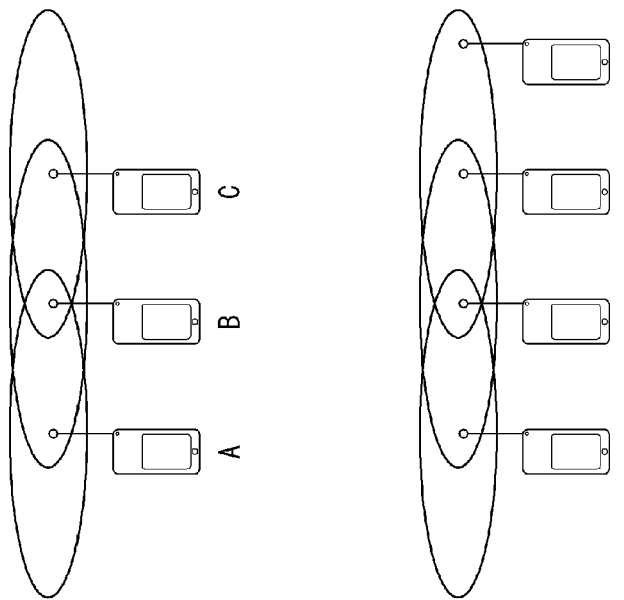
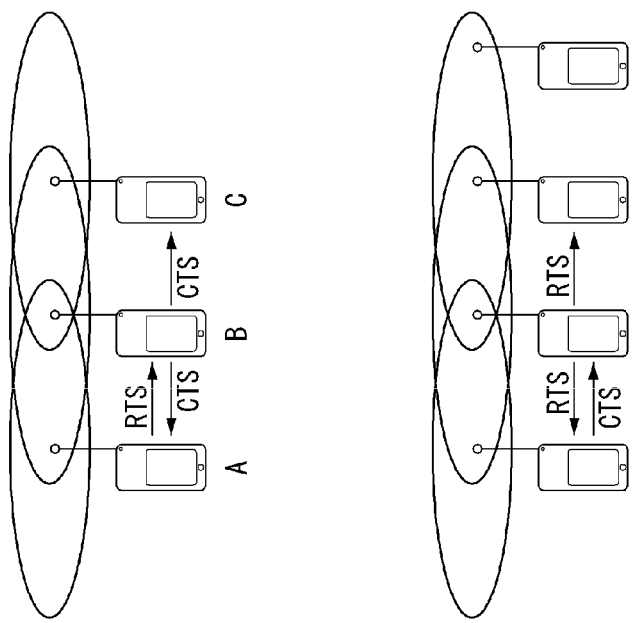

[Figure 14]
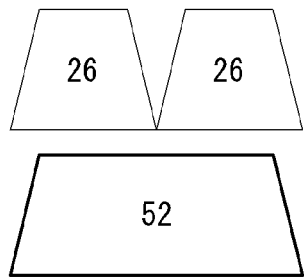
[Figure 15]
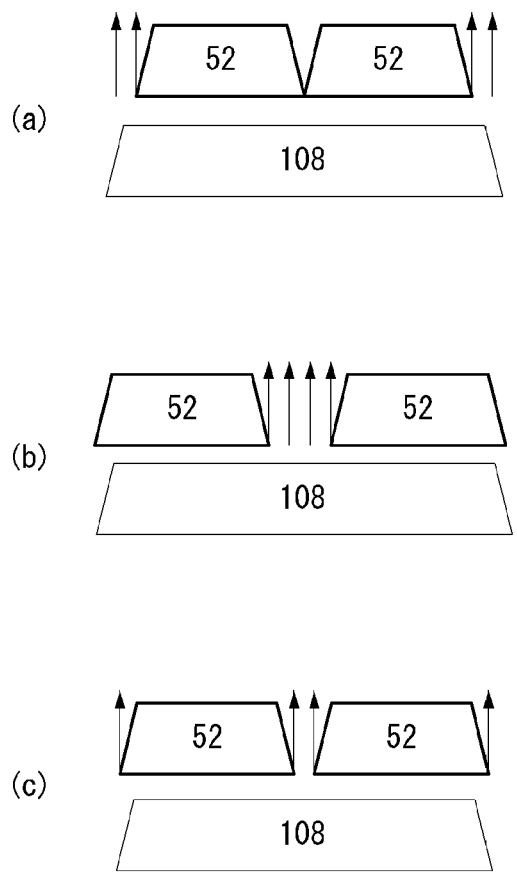
(a)
(b)
(c)
[Figure 16]
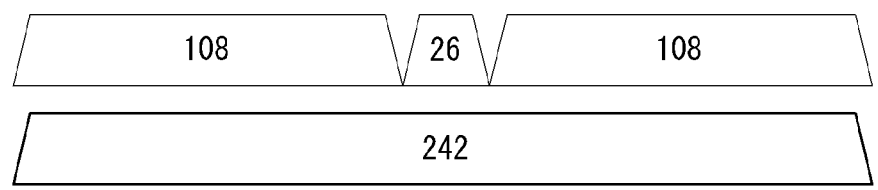

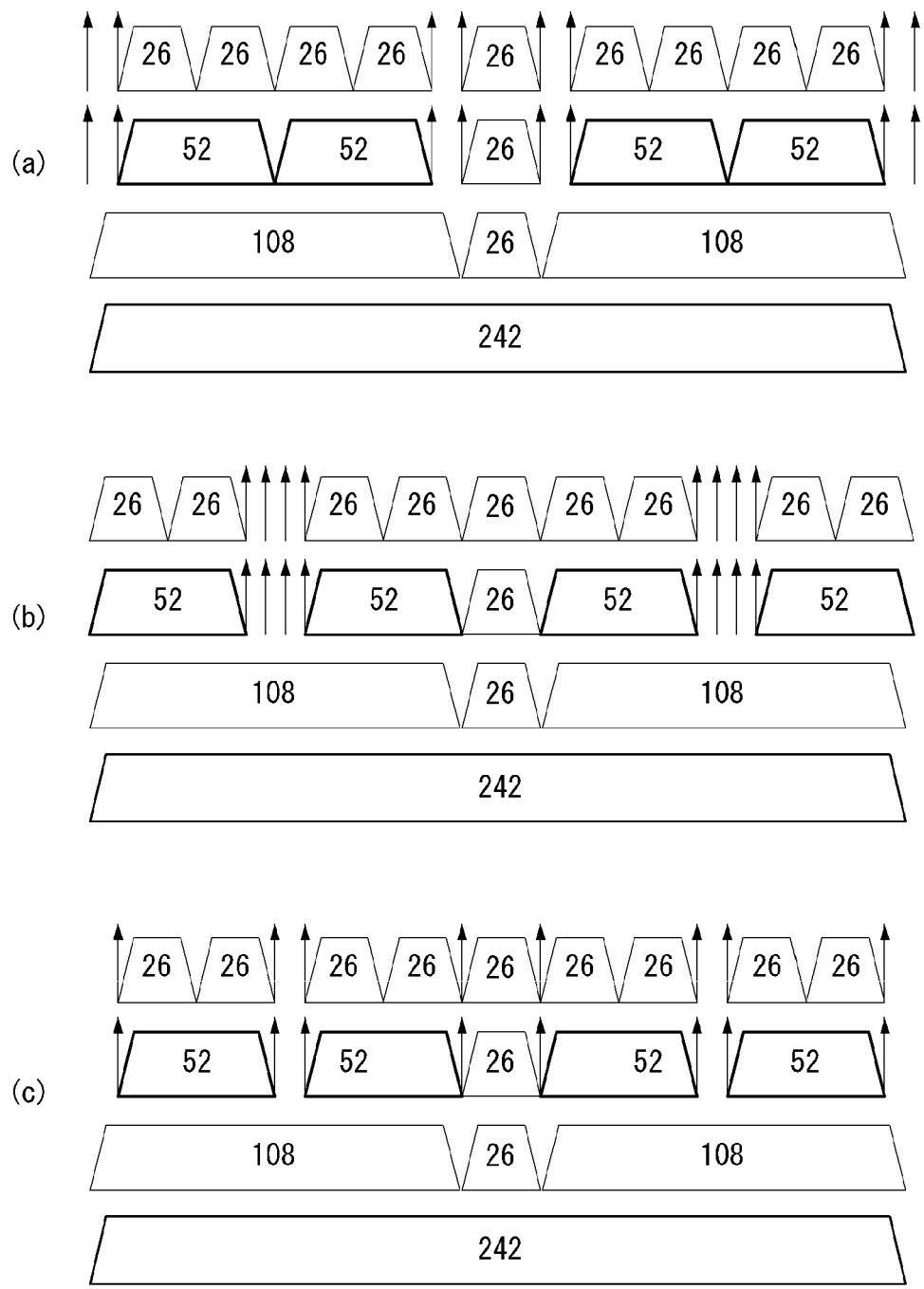
[Figure 17]

[Figure 18]
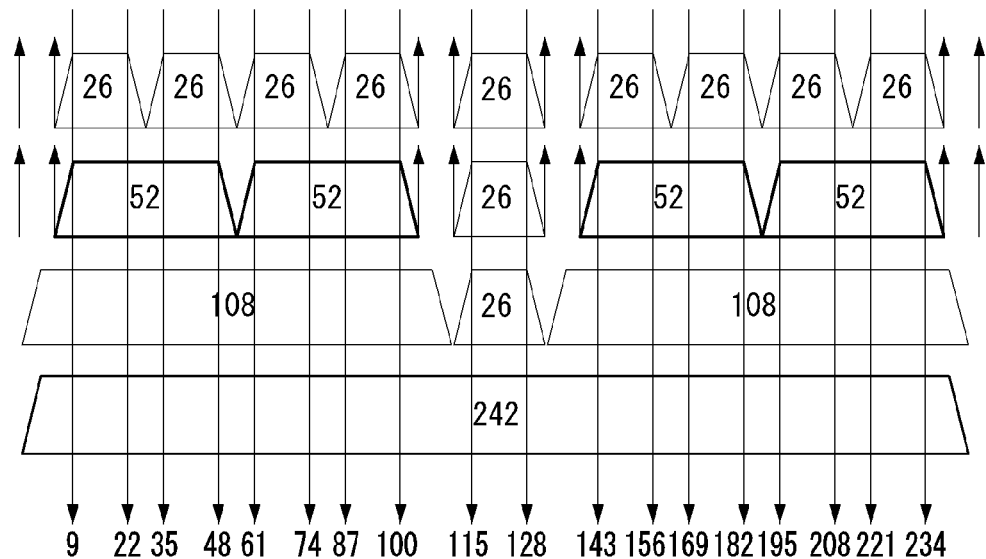
[Figure 19]
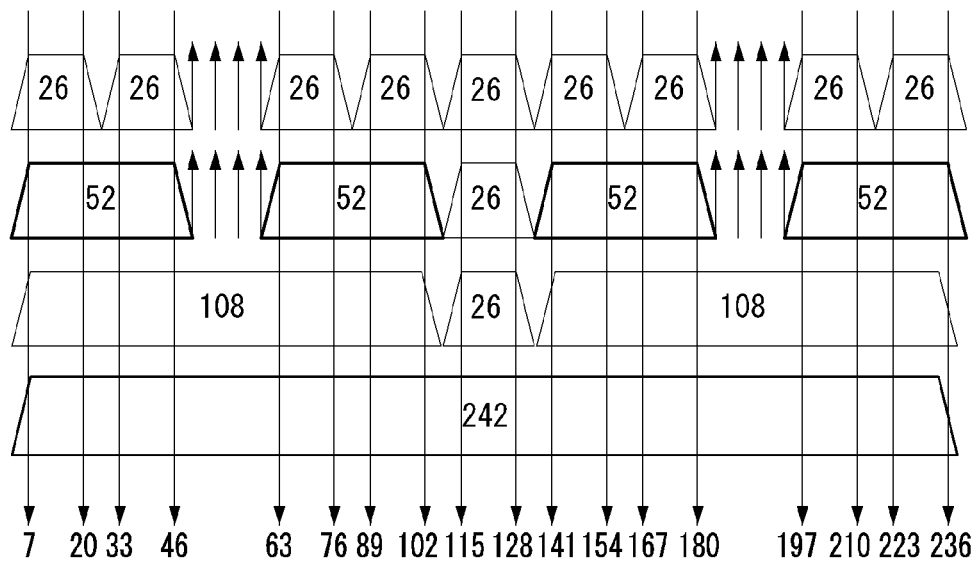

[Figure 20]
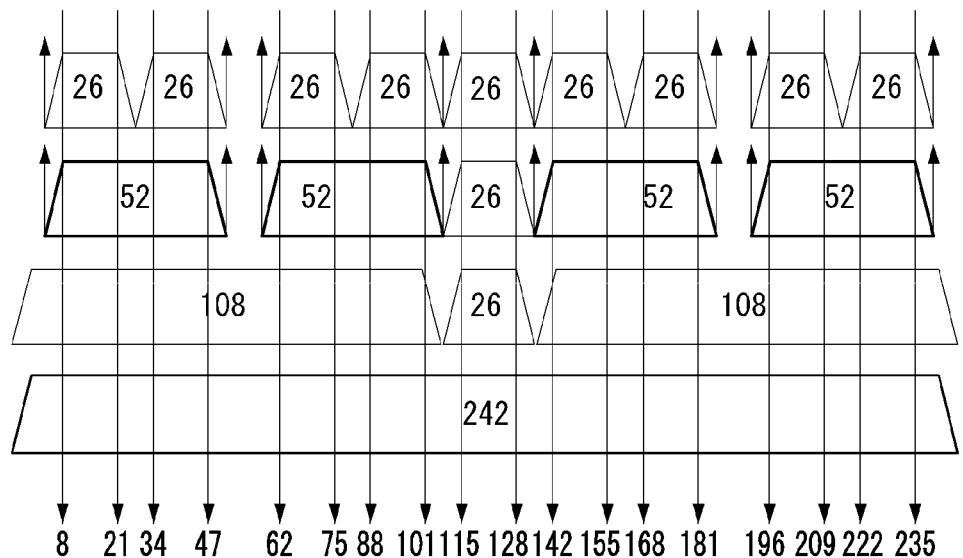
[Figure 21]
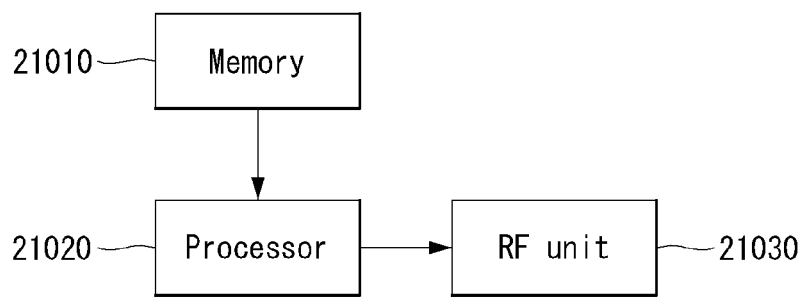
[Figure 22]
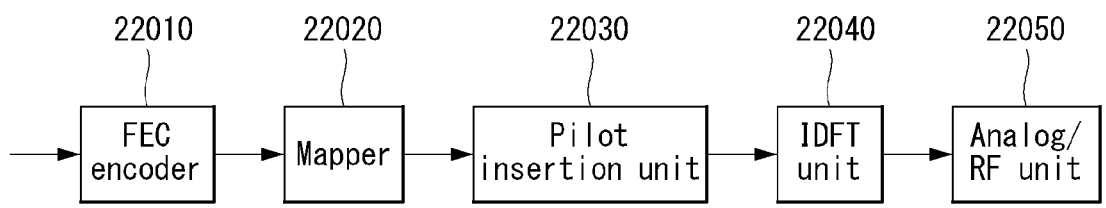

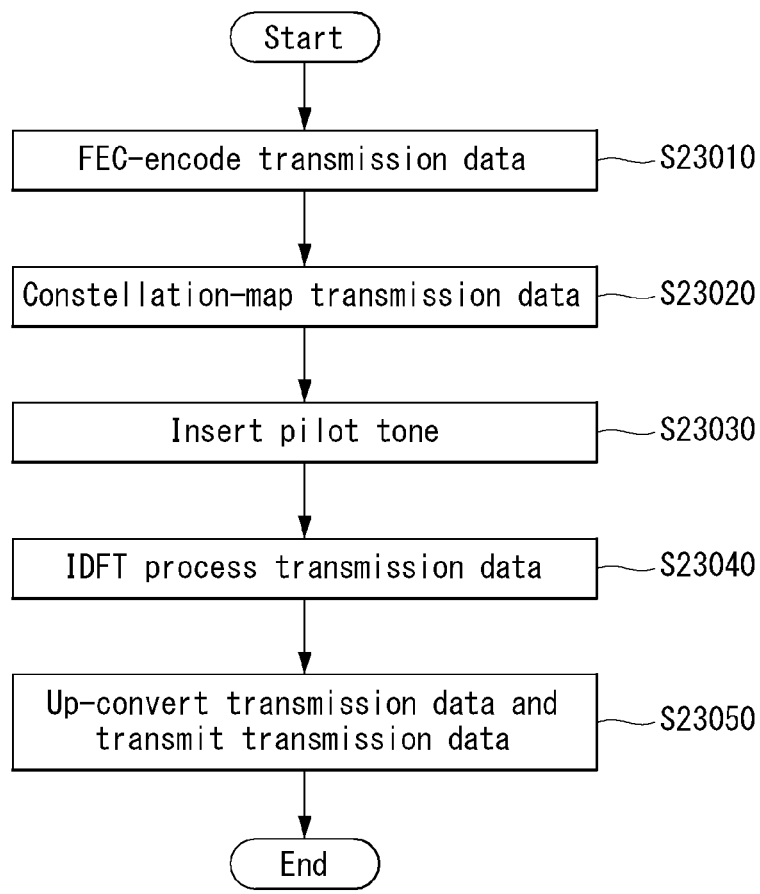
[Figure 23]

TRANSMITTING AND RECEIVING DEVICE AND METHOD IN WIRELESS COMMUNICATION SYSTEM

CROSS-REFERENCE TO RELATED APPLICATIONS

This application is the National Stage filing under 35 U.S.C. 371 of International Application No. PCT/KR2015/008125, filed on Aug. 4, 2015, which claims the benefit of U.S. Provisional Application No. 62/119,267, filed on Feb. 23, 2015, the contents of which are all hereby incorporated by reference herein in their entirety.

TECHNICAL FIELD

The present invention relates to a wireless communication system and, more particularly, to a method for allocating a resource block when signal processing is performed using an OFDMA scheme in a wireless communication system, a method for deploying a pilot signal for an allocated resource block, and an apparatus performing such a method.

BACKGROUND ART

Wi-Fi is a wireless local area network (WLAN) technology which enables a device to access the Internet in a frequency band of 2.4 GHz, 5 GHz or 60 GHz.

A WLAN is based on the institute of electrical and electronic engineers (IEEE) 802.11 standard. The wireless next generation standing committee (WING SC) of IEEE 802.11 is an ad-hoc committee which is worried about the next-generation wireless local area network (WLAN) in the medium to longer term.

IEEE 802.11n has an object of increasing the speed and reliability of a network and extending the coverage of a wireless network. More specifically, IEEE 802.11n supports a high throughput (HT) providing a maximum data rate of 600 Mbps. Furthermore, in order to minimize a transfer error and to optimize a data rate, IEEE 802.11n is based on a multiple inputs and multiple outputs (MIMO) technology in which multiple antennas are used at both ends of a transmission unit and a reception unit.

As the spread of a WLAN is activated and applications using the WLAN are diversified, in the next-generation WLAN system supporting a very high throughput (VHT), IEEE 802.11ac has been newly enacted as the next version of an IEEE 802.11n WLAN system. IEEE 802.11ac supports a data rate of 1 Gbps or more through 80 MHz bandwidth transmission and/or higher bandwidth transmission (e.g., 160 MHz), and chiefly operates in a 5 GHz band.

Recently, a need for a new WLAN system for supporting a higher throughput than a data rate supported by IEEE 802.11ac comes to the fore.

The scope of IEEE 802.11ax chiefly discussed in the next-generation WLAN task group called a so-called IEEE 802.11ax or high efficiency (HEW) WLAN includes 1) the improvement of an 802.11 physical (PHY) layer and medium access control (MAC) layer in bands of 2.4 GHz, 5 GHz, etc., 2) the improvement of spectrum efficiency and area throughput, 3) the improvement of performance in actual indoor and outdoor environments, such as an environment in which an interference source is present, a dense heterogeneous network environment, and an environment in which a high user load is present and so on.

A scenario chiefly taken into consideration in IEEE 802.11ax is a dense environment in which many access points (APs) and many stations (STAs) are present. In IEEE 802.11ax, the improvement of spectrum efficiency and area throughput is discussed in such a situation.

More specifically, there is an interest in the improvement of substantial performance in outdoor environments not greatly taken into consideration in existing WLANs in addition to indoor environments.

In IEEE 802.11ax, there is a great interest in scenarios, such as wireless offices, smart homes, stadiums, hotspots, and buildings/apartments. The improvement of system performance in a dense environment in which many APs and many STAs are present is discussed based on the corresponding scenarios.

In the future, it is expected in IEEE 802.11ax that the improvement of system performance in an overlapping basic service set (OBSS) environment, the improvement of an outdoor environment, cellular offloading, and so on rather than single link performance improvement in a single basic service set (BSS) will be actively discussed. The directivity of such IEEE 802.11ax means that the next-generation WLAN will have a technical scope gradually similar to that of mobile communication. Recently, when considering a situation in which mobile communication and a WLAN technology are discussed together in small cells and direct-to-direct (D2D) communication coverage, it is expected that the technological and business convergence of the next-generation WLAN based on IEEE 802.11ax and mobile communication will be further activated.

DISCLOSURE

Technical Problem

As described above, new frame formats and numerologies for an 802.11ax system, that is, the next-generation wireless LAN system, are actively discussed.

More specifically, in order to enhance the throughput of a system or to enhance the robustness of inter-symbol interference (ISI) in an outdoor environment, it is expected that an FFT size increased compared to the existing FFT size in a given system bandwidth will be applied. Furthermore, the extension of a multi-user transmission method proposed in the existing 802.11ac system to an uplink situation and the introduction of an OFDMA transmission method are also discussed along with the increased FFT size.

More specifically, a tone plan to be used in an OFDMA scheme is now actively discussed. How a given bandwidth will be divided into what tone size and used is importantly discussed. Furthermore, a method for determining that a pilot signal will be placed in which tone position for each tone size is also an important problem.

Technical Solution

Embodiments of the present invention propose an STA apparatus in a WLAN system and a data transmission method of the STA apparatus.

In an embodiment of the present invention, a data transmission method of a station (STA) apparatus in a wireless local area network (WLAN) system includes FEC-encoding transmission data, constellation-mapping the transmission data, inserting a pilot tone into the transmission data, performing inverse discrete Fourier transform (IDFT) on the transmission data, and up-converting the transmission data and transmitting a transmission signal. If an orthogonal frequency division multiple access (OFDMA) scheme is applied to the transmission signal, the transmission signal may include at least one tone-unit which is a basis for subcarrier allocation of the OFDMA scheme.

Furthermore, in the data transmission method of the station (STA) apparatus in the wireless local area network (WLAN) system according to an embodiment of the present invention, the at least one tone-unit may include at least one of a 26 tone-unit, a 52 tone-unit, and a 242 tone-unit.

Furthermore, in the data transmission method of the station (STA) apparatus in the wireless local area network (WLAN) system according to an embodiment of the present invention, the 26 tone-unit may include two pilot tones, the 52 tone-unit may include four pilot tones, and the 242 tone-unit may include eight pilot tones.

Furthermore, in the data transmission method of the station (STA) apparatus in the wireless local area network (WLAN) system according to an embodiment of the present invention, the two pilot tones included in the 26 tone-unit may be inserted into the seventh tone and twentieth tone of the 26 tone-unit.

Furthermore, in the data transmission method of the station (STA) apparatus in the wireless local area network (WLAN) system according to an embodiment of the present invention, the four pilot tones of the 52 tone-unit may be inserted into the seventh tone, twentieth tone, thirty-third tone, and forty-sixth tone of the 52 tone-unit.

Furthermore, in the data transmission method of the station (STA) apparatus in the wireless local area network (WLAN) system according to an embodiment of the present invention, if the 242 tone-unit includes one 26 tone-unit and four 52 tone-units, the 26-tone-unit may be disposed at the center of the 242 tone-unit and the two 52 tone-units may be disposed on both sides of the 26-tone-unit placed at the center, respectively.

An STA apparatus in a WLAN system according to an embodiment of the present invention may perform the aforementioned data transmission method. The STA apparatus of the WLAN system according to an embodiment of the present invention includes an FEC encoder configured to FEC-encode transmission data, a mapper configured to constellation-map the transmission data, a pilot insertion unit configured to insert a pilot tone into the transmission data, an inverse discrete Fourier transform (IDFT) unit configured to perform IDFT on the transmission data, and an RF unit configured to up-convert the transmission data and transmit a transmission signal. If an orthogonal frequency division multiple access (OFDMA) scheme is applied to the transmission signal, the transmission signal may include at least one tone-unit which is a basis for subcarrier allocation of the OFDMA scheme.

Advantageous Effects

An embodiment of the present invention proposes a tone plan capable of maximizing compatibility with the legacy 802.11 system while satisfying symmetry when the OFDMA scheme is used and thus maximizing the elements of the legacy 802.11 system. Furthermore, there is proposed a tone plan capable of maximizing symmetry and an equi-space according to the proposed tone plan.

A WLAN system can reuse a legacy system configuration to a maximum extent or reuse the legacy system configuration with a minimum change and can also optimize time/frequency offset estimation performance according to the use of a pilot using a tone plan according to an embodiment of the present invention and the number and positions of corresponding pilots.

Other advantages of the present invention are further described in the following embodiments.

DESCRIPTION OF DRAWINGS

FIG. 1 is a diagram showing an example of an IEEE 802.11 system to which an embodiment of the present invention may be applied.

FIG. 2 is a diagram illustrating the configuration of layer architecture of an IEEE 802.11 system to which an embodiment of the present invention may be applied.

FIG. 3 illustrating a non-HT format PPDU and an HT format PPDU in a wireless communication system to which an embodiment of the present invention may be applied.

FIG. 4 illustrates a VHT format PPDU in a wireless communication system to which an embodiment of the present invention may be applied.

FIG. 5 is a diagram illustrating a constellation for classifying the format of a PPDU in a wireless communication system to which an embodiment of the present invention may be applied.

FIG. 6 illustrates the format of an MAC frame in an IEEE 802.11 system to which an embodiment of the present invention may be applied.

FIG. 7 is a diagram illustrating a frame control field within an MAC frame in a wireless communication system to which an embodiment of the present invention may be applied.

FIG. 8 illustrates the HT format of an HT control field in the MAC frame of FIG. 6.

FIG. 9 illustrates the VHT format of an HT control field in a wireless communication system to which an embodiment of the present invention may be applied.

FIG. 10 is a diagram illustrating a common uplink setup procedure in a wireless communication system to which an embodiment of the present invention may be applied.

FIG. 11 is a diagram illustrating a random backoff period and a frame transmission procedure in a wireless communication system to which an embodiment of the present invention may be applied.

FIG. 12 is a diagram illustrating a hidden node and an exposed node in a wireless communication system to which an embodiment of the present invention may be applied.

FIG. 13 is a diagram illustrating an RTS and a CTS in a wireless communication system to which an embodiment of the present invention may be applied.

FIG. 14 shows the OFDMA tone-units of a 52 tone size according to an embodiment of the present invention.

FIG. 15 shows the OFDMA tone-units of a 108 tone size according to an embodiment of the present invention.

FIG. 16 shows the OFDMA tone-units of a 242 tone size according to an embodiment of the present invention.

FIG. 17 shows the OFDMA tone-units of a 242 tone size according to another embodiment of the present invention.

FIG. 18 shows a method for determining the position of pilot tones according to an embodiment of the present invention.

FIG. 19 shows a method for determining the position of pilot tones according to another embodiment of the present invention.

FIG. 20 shows a method for determining the position of pilot tones according to another embodiment of the present invention.

FIG. 21 shows an STA apparatus according to an embodiment of the present invention.

FIG. 22 is a detailed diagram showing part of the STA apparatus according to an embodiment of the present invention.

FIG. 23 is a flowchart illustrating a data transmission method of an STA according to an embodiment of the present invention.

MODE FOR INVENTION

Hereinafter, some embodiments of the present invention are described in detail with reference to the accompanying drawings. The detailed description to be disclosed herein along with the accompanying drawings is provided to describe exemplary embodiments of the present invention and is not intended to describe a sole embodiment in which the present invention may be implemented. The following detailed description includes detailed contents in order to provide complete understanding of the present invention. However, those skilled in the art will appreciate that the present invention may be implemented even without such detailed contents.

In some cases, in order to avoid making the concept of the present invention vague, the known structure and/or device may be omitted or may be illustrated in the form of a block diagram based on the core function of each structure and/or device.

Furthermore, specific terms used in the following description are provided to help understanding of the present invention, and such specific terms may be changed into other forms without departing from the technical spirit of the present invention.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for Mobile communications (GSM)/general packet radio service (GPRS)/enhanced data rates for GSM evolution (EDGE). OFDMA may be implemented using a radio technology, such as institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). $3^{rd}$ generation partnership project (3GPP) long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A is chiefly described, but the technical characteristics of the present invention are not limited thereto.

General System

FIG. 1 is a diagram showing an example of an IEEE 802.11 system to which an embodiment of the present invention may be applied.

The IEEE 802.11 configuration may include a plurality of elements. There may be provided a wireless communication system supporting transparent station (STA) mobility for a higher layer through an interaction between the elements. A basic service set (BSS) may correspond to a basic configuration block in an IEEE 802.11 system.

FIG. 1 illustrates that three BSSs BSS 1 to BSS 3 are present and two STAs (e.g., an STA 1 and an STA 2 are included in the BSS 1, an STA 3 and an STA 4 are included in the BSS 2, and an STA 5 and an STA 6 are included in the BSS 3) are included as the members of each BSS.

In FIG. 1, an ellipse indicative of a BSS may be interpreted as being indicative of a coverage area in which STAs included in the corresponding BSS maintain communication. Such an area may be called a basic service area (BSA). When an STA moves outside the BSA, it is unable to directly communicate with other STAs within the corresponding BSA.

In the IEEE 802.11 system, the most basic type of a BSS is an independent a BSS (IBSS). For example, an IBSS may have a minimum form including only two STAs. Furthermore, the BSS 3 of FIG. 1 which is the simplest form and from which other elements have been omitted may correspond to a representative example of the IBSS. Such a configuration may be possible if STAs can directly communicate with each other. Furthermore, a LAN of such a form is not previously planned and configured, but may be configured when it is necessary. This may also be called an ad-hoc network.

When an STA is powered off or on or an STA enters into or exits from a BSS area, the membership of the STA in the BSS may be dynamically changed. In order to become a member of a BSS, an STA may join the BSS using a synchronization process. In order to access all of services in a BSS-based configuration, an STA needs to be associated with the BSS. Such association may be dynamically configured, and may include the use of a distribution system service (DSS).

In an 802.11 system, the distance of a direct STA-to-STA may be constrained by physical layer (PHY) performance. In any case, the limit of such a distance may be sufficient, but communication between STAs in a longer distance may be required, if necessary. In order to support extended coverage, a distribution system (DS) may be configured.

The DS means a configuration in which BSSs are interconnected. More specifically, a BSS may be present as an element of an extended form of a network including a plurality of BSSs instead of an independent BSS as in FIG. 1.

The DS is a logical concept and may be specified by the characteristics of a distribution system medium (DSM). In the IEEE 802.11 standard, a wireless medium (WM) and a distribution system medium (DSM) are logically divided. Each logical medium is used for a different purpose and used by a different element. In the definition of the IEEE 802.11 standard, such media are not limited to the same one and are also not limited to different ones. The flexibility of the configuration (i.e., a DS configuration or another network configuration) of an IEEE 802.11 system may be described in that a plurality of media is logically different as described above. That is, an IEEE 802.11 system configuration may be implemented in various ways, and a corresponding system configuration may be independently specified by the physical characteristics of each implementation example.

The DS can support a mobile device by providing the seamless integration of a plurality of BSSs and providing logical services required to handle an address to a destination.

An AP means an entity which enables access to a DS through a WM with respect to associated STAs and has the STA functionality. The movement of data between a BSS and the DS can be performed through an AP. For example, each of the STA 2 and the STA 3 of FIG. 1 has the functionality of an STA and provides a function which enables associated STAs (e.g., the STA 1 and the STA 4) to access the DS. Furthermore, all of APs basically correspond to an STA, and thus all of the APs are entities capable of being addressed. An address used by an AP for communication on a WM and an address used by an AP for communication on a DSM may not need to be necessarily the same.

Data transmitted from one of STAs, associated with an AP, to the STA address of the AP may be always received by an uncontrolled port and processed by an IEEE 802.1X port access entity. Furthermore, when a controlled port is authenticated, transmission data (or frame) may be delivered to a DS.

A wireless network having an arbitrary size and complexity may include a DS and BSSs. In an IEEE 802.11 system, a network of such a method is called an extended service set (ESS) network. The ESS may correspond to a set of BSSs connected to a single DS. However, the ESS does not include a DS. The ESS network is characterized in that it looks like an IBSS network in a logical link control (LLC) layer. STAs included in the ESS may communicate with each other. Mobile STAs may move from one BSS to the other BSS (within the same ESS) in a manner transparent to the LLC layer.

In an IEEE 802.11 system, the relative physical positions of BSSs in FIG. 1 are not assumed, and the following forms are all possible.

More specifically, BSSs may partially overlap, which is a form commonly used to provide consecutive coverage. Furthermore, BSSs may not be physically connected, and logically there is no limit to the distance between BSSs. Furthermore, BSSs may be placed in the same position physically and may be used to provide redundancy. Furthermore, one (or one or more) IBSS or ESS networks may be physically present in the same space as one or more ESS networks. This may correspond to an ESS network form if an ad-hoc network operates at the position in which an ESS network is present, if IEEE 802.11 networks that physically overlap are configured by different organizations, or if two or more different access and security policies are required at the same position.

In a WLAN system, an STA is an apparatus operating in accordance with the medium access control (MAC)/PHY regulations of IEEE 802.11. An STA may include an AP STA and a non-AP STA unless the functionality of the STA is not individually different from that of an AP. In this case, assuming that communication is performed between an STA and an AP, the STA may be interpreted as being a non-AP STA. In the example of FIG. 1, the STA 1, the STA 4, the STA 5, and the STA 6 correspond to non-AP STAs, and the STA 2 and the STA 3 correspond to AP STAs.

A non-AP STA corresponds to an apparatus directly handled by a user, such as a laptop computer or a mobile phone. In the following description, a non-AP STA may also be called a wireless device, a terminal, user equipment (UE), a mobile station (MS), a mobile terminal, a wireless terminal, a wireless transmit/receive unit (WTRU), a network interface device, a machine-type communication (MTC) device, a machine-to-machine (M2M) device or the like.

Furthermore, an AP is a concept corresponding to a base station (BS), a node-B, an evolved Node-B (eNB), a base transceiver system (BTS), a femto BS or the like in other wireless communication fields.

Hereinafter, in this specification, downlink (DL) means communication from an AP to a non-AP STA. Uplink (UL) means communication from a non-AP STA to an AP. In DL, a transmitter may be part of an AP, and a receiver may be part of a non-AP STA. In UL, a transmitter may be part of a non-AP STA, and a receiver may be part of an AP.

FIG. 2 is a diagram illustrating the configuration of layer architecture of an IEEE 802.11 system to which an embodiment of the present invention may be applied.

Referring to FIG. 2, the layer architecture of the IEEE 802.11 system may include an MAC sublayer and a PHY sublayer.

The PHY sublayer may be divided into a physical layer convergence procedure (PLCP) entity and a physical medium dependent (PMD) entity. In this case, the PLCP entity functions to connect the MAC sublayer and a data frame, and the PMD entity functions to wirelessly transmit and receive data to and from two or more STAs.

The MAC sublayer and the PHY sublayer may include respective management entities, which may be referred to as an MAC sublayer management entity (MLME) and a PHY sublayer management entity (PLME), respectively. The management entities provide a layer management service interface through the operation of a layer management function. The MLME is connected to the PLME and may perform the management operation of the MAC sublayer. Likewise, the PLME is also connected to the MLME and may perform the management operation of the PHY sublayer.

In order to provide a precise MAC operation, a station management entity (SME) may be present in each STA. The SME is a management entity independent of each layer, and collects layer-based state information from the MLME and the PLME or sets the values of layer-specific parameters. The SME may perform such a function instead of common system management entities and may implement a standard management protocol.

The MLME, the PLME, and the SME may interact with each other using various methods based on primitives. More specifically, an XX-GET.request primitive is used to request the value of a management information base (MIB) attribute. An XX-GET.confirm primitive returns the value of a corresponding MIB attribute if the state is "SUCCESS", and indicates an error in the state field and returns the value in other cases. An XX-SET.request primitive is used to make a request so that a designated MIB attribute is set as a given value. If an MIB attribute means a specific operation, such a request requests the execution of the specific operation. Furthermore, an XX-SET.confirm primitive means that a designated MIB attribute has been set as a requested value if the state is "SUCCESS." In other cases, the XX-SET.confirm primitive indicates that the state field is an error situation. If an MIB attribute means a specific operation, the primitive may confirm that a corresponding operation has been performed.

An operation in each sublayer is described in brief as follows.

The MAC sublayer generates one or more MAC protocol data units (MPDUs) by attaching an MAC header and a frame check sequence (FCS) to a MAC service data unit (MSDU) received from a higher layer (e.g., an LLC layer) or the fragment of the MSDU. The generated MPDU is delivered to the PHY sublayer.

If an aggregated MSDU (A-MSDU) scheme is used, a plurality of MSDUs may be aggregated into a single aggregated MSDU (A-MSDU). The MSDU aggregation operation may be performed in an MAC higher layer. The A-MSDU is delivered to the PHY sublayer as a single MPDU (if it is not fragmented).

The PHY sublayer generates a physical protocol data unit (PPDU) by attaching an additional field, including information for a PHY transceiver, to a physical service data unit (PSDU) received from the MAC sublayer. The PPDU is transmitted through a wireless medium.

The PSDU has been received by the PHY sublayer from the MAC sublayer, and the MPDU has been transmitted from the MAC sublayer to the PHY sublayer. Accordingly, the PSDU is substantially the same as the MPDU.

If an aggregated MPDU (A-MPDU) scheme is used, a plurality of MPDUs (in this case, each MPDU may carry an A-MSDU) may be aggregated in a single A-MPDU. The MPDU aggregation operation may be performed in an MAC lower layer. The A-MPDU may include an aggregation of various types of MPDUs (e.g., QoS data, acknowledge (ACK), and a block ACK (BlockAck)). The PHY sublayer receives an A-MPDU, that is, a single PSDU, from the MAC sublayer. That is, the PSDU includes a plurality of MPDUs. Accordingly, the A-MPDU is transmitted through a wireless medium within a single PPDU.

Physical Protocol Data Unit (PPDU) Format

A PPDU means a data block generated in the physical layer. A PPDU format is described below based on an IEEE 802.11 a WLAN system to which an embodiment of the present invention may be applied.

FIG. 3 illustrating a non-HT format PPDU and an HT format PPDU in a wireless communication system to which an embodiment of the present invention may be applied.

FIG. 3(a) illustrates a non-HT format PPDU for supporting IEEE 802.11a/g systems. The non-HT PPDU may also be called a legacy PPDU.

Referring to FIG. 3(a), the non-HT format PPDU is configured to include a legacy format preamble, including a legacy (or non-HT) short training field (L-STF), a legacy (or non-HT) long training field (L-LTF), and a legacy (or non-HT) signal (L-SIG) field, and a data field.

The L-STF may include a short training orthogonal frequency division multiplexing symbol (OFDM). The L-STF may be used for frame timing acquisition, automatic gain control (AGC), diversity detection, and coarse frequency/time synchronization.

The L-LTF may include a long training OFDM symbol. The L-LTF may be used for fine frequency/time synchronization and channel estimation.

The L-SIG field may be used to send control information for the demodulation and decoding of the data field. The L-SIG field may include information about a data rate and a data length.

FIG. 3(b) illustrates an HT mixed format PPDU for supporting both an IEEE 802.11n system and IEEE 802.11a/g system.

Referring to FIG. 3(b), the HT mixed format PPDU is configured to include a legacy format preamble including an L-STF, an L-LTF, and an L-SIG field, an HT format preamble including an HT-signal (HT-SIG) field, a HT short training field (HT-STF), and a HT long training field (HT-LTF), and a data field.

The L-STF, the L-LTF, and the L-SIG field mean legacy fields for backward compatibility and are the same as those of the non-HT format from the L-STF to the L-SIG field. An L-STA may interpret a data field through an L-LTF, an L-LTF, and an L-SIG field although it receives an HT mixed PPDU. In this case, the L-LTF may further include information for channel estimation to be performed by an HT-STA in order to receive the HT mixed PPDU and to demodulate the L-SIG field and the HT-SIG field.

An HT-STA may be aware of an HT mixed format PPDU using the HT-SIG field subsequent to the legacy fields, and may decode the data field based on the HT mixed format PPDU.

The HT-LTF may be used for channel estimation for the demodulation of the data field. IEEE 802.11n supports single user multi-input and multi-output (SU-MIMO) and thus may include a plurality of HT-LTFs for channel estimation with respect to each of data fields transmitted in a plurality of spatial streams.

The HT-LTF may include a data HT-LTF used for channel estimation for a spatial stream and an extension HT-LTF additionally used for full channel sounding. Accordingly, a plurality of HT-LTFs may be the same as or greater than the number of transmitted spatial streams.

In the HT mixed format PPDU, the L-STF, the L-LTF, and the L-SIG fields are first transmitted so that an L-STA can receive the L-STF, the L-LTF, and the L-SIG fields and obtain data. Thereafter, the HT-SIG field is transmitted for the demodulation and decoding of data transmitted for an HT-STA.

An L-STF, an L-LTF, and L-SIG fields are transmitted without performing beamforming up to an HT-SIG field so that an L-STA and an HT-STA can receive a corresponding PPDU and obtain data. In an HT-STF, an HT-LTF, and a data field that are subsequently transmitted, radio signals are transmitted through precoding. In this case, an HT-STF is transmitted so that an STA receiving a corresponding PPDU by performing precoding may take into considerate a portion whose power is varied by precoding, and a plurality of HT-LTFs and a data field are subsequently transmitted.

FIG. 3(c) illustrates an HT-green field format PPDU (HT-GF format PPDU) for supporting only an IEEE 802.11n system.

Referring to FIG. 3(c), the HT-GF format PPDU includes an HT-GF-STF, an HT-LTF1, an HT-SIG field, a plurality of HT-LTF2s, and a data field.

The HT-GF-STF is used for frame timing acquisition and AGC.

The HT-LTF1 is used for channel estimation.

The HT-SIG field is used for the demodulation and decoding of the data field.

The HT-LTF2 is used for channel estimation for the demodulation of the data field. Likewise, an HT-STA uses SU-MIMO. Accordingly, a plurality of the HT-LTF2s may be configured because channel estimation is necessary for each of data fields transmitted in a plurality of spatial streams.

The plurality of HT-LTF2s may include a plurality of data HT-LTFs and a plurality of extension HT-LTFs like the HT-LTF of the HT mixed PPDU.

In FIGS. 3(a) to 3(c), the data field is a payload and may include a service field, a scrambled PSDU (PSDU) field, tail bits, and padding bits. All of the bits of the data field are scrambled.

FIG. 3(d) illustrates a service field included in the data field. The service field has 16 bits. The 16 bits are assigned No. 0 to No. 15 and are sequentially transmitted from the No. 0 bit. The No. 0 bit to the No. 6 bit are set to 0 and are used to synchronize a descrambler within a reception stage.

An IEEE 802.11ac WLAN system supports the transmission of a DL multi-user multiple input multiple output (MU-MIMO) method in which a plurality of STAs accesses a channel at the same time in order to efficiently use a radio channel. In accordance with the MU-MIMO transmission method, an AP may simultaneously transmit a packet to one or more STAs that have been subjected to MIMO pairing.

Downlink multi-user transmission (DL MU transmission) means a technology in which an AP transmits a PPDU to a plurality of non-AP STAs through the same time resources using one or more antennas.

Hereinafter, an MU PPDU means a PPDU which delivers one or more PSDUs for one or more STAs using the MU-MIMO technology or the OFDMA technology. Furthermore, an SU PPDU means a PPDU having a format in which only one PSDU can be delivered or which does not have a PSDU.

For MU-MIMO transmission, the size of control information transmitted to an STA may be relatively larger than the size of 802.11n control information. Control information additionally required to support MU-MIMO may include information indicating the number of spatial streams received by each STA and information related to the modulation and coding of data transmitted to each STA may correspond to the control information, for example.

Accordingly, when MU-MIMO transmission is performed to provide a plurality of STAs with a data service at the same time, the size of transmitted control information may be increased according to the number of STAs which receive the control information.

In order to efficiently transmit the control information whose size is increased as described above, a plurality of pieces of control information required for MU-MIMO transmission may be divided into two types of control information: common control information that is required for all of STAs in common and dedicated control information individually required for a specific STA, and may be transmitted.

FIG. 4 illustrates a VHT format PPDU in a wireless communication system to which an embodiment of the present invention may be applied.

FIG. 4 illustrates a VHT format PPDU for supporting an IEEE 802.11ac system.

Referring to FIG. 4, the VHT format PPDU is configured to include a legacy format preamble including an L-STF, an L-LTF, and an L-SIG field, a VHT format preamble including a VHT-signal-A (VHT-SIG-A) field, a VHT short training field (VHT-STF), a VHT long training field (VHT-LTF), and a VHT-signal-B (VHT-SIG-B) field, and a data field.

The L-STF, the L-LTF, and the L-SIG field mean legacy fields for backward compatibility and have the same formats as those of the non-HT format. In this case, the L-LTF may further include information for channel estimation which will be performed in order to demodulate the L-SIG field and the VHT-SIG-A field.

The L-STF, the L-LTF, the L-SIG field, and the VHT-SIG-A field may be repeated in a 20 MHz channel unit and transmitted. For example, when a PPDU is transmitted through four 20 MHz channels (i.e., an 80 MHz bandwidth), the L-STF, the L-LTF, the L-SIG field, and the VHT-SIG-A field may be repeated every 20 MHz channel and transmitted.

A VHT-STA may be aware of the VHT format PPDU using the VHT-SIG-A field subsequent to the legacy fields, and may decode the data field based on the VHT-SIG-A field.

In the VHT format PPDU, the L-STF, the L-LTF, and the L-SIG field are first transmitted so that even an L-STA can receive the VHT format PPDU and obtain data. Thereafter, the VHT-SIG-A field is transmitted for the demodulation and decoding of data transmitted for a VHT-STA.

The VHT-SIG-A field is a field for the transmission of control information that is common to a VHT STAs that are MIMO-paired with an AP, and includes control information for interpreting the received VHT format PPDU.

The VHT-SIG-A field may include a VHT-SIG-A1 field and a VHT-SIG-A2 field.

The VHT-SIG-A1 field may include information about a channel bandwidth (BW) used, information about whether space time block coding (STBC) is applied or not, a group identifier (ID) for indicating a group of grouped STAs in MU-MIMO, information about the number of streams used (the number of space-time streams (NSTS)/part association identifier (AID), and transmit power save forbidden information. In this case, the group ID means an identifier assigned to a target transmission STA group in order to support MU-MIMO transmission, and may indicate whether the present MIMO transmission method is MU-MIMO or SU-MIMO.

The VHT-SIG-A2 field may include information about whether a short guard interval (GI) is used or not, forward error correction (FEC) information, information about a modulation and coding scheme (MCS) for a single user, information about the type of channel coding for multiple users, beamforming-related information, redundancy bits for cyclic redundancy checking (CRC), the tail bits of a convolutional decoder and so on.

The VHT-STF is used to improve AGC estimation performance in MIMO transmission.

The VHT-LTF is used for a VHT-STA to estimate an MIMO channel. Since a VHT WLAN system supports MU-MIMO, the VHT-LTF may be configured by the number of spatial streams through which a PPDU is transmitted. Additionally, if full channel sounding is supported, the number of VHT-LTFs may be increased.

The VHT-SIG-B field includes dedicated control information which is necessary for a plurality of MU-MIMO-paired VHT-STAs to receive a PPDU and to obtain data. Accordingly, only when common control information included in the VHT-SIG-A field indicates that a received PPDU is for MU-MIMO transmission, a VHT-STA may be designed to decode the VHT-SIG-B field. In contrast, if common control information indicates that a received PPDU is for a single VHT-STA (including SU-MIMO), an STA may be designed to not decode the VHT-SIG-B field.

The VHT-SIG-B field may include information for modulation, encoding and rate-matching of each VHT-STA. The siz of the VHT-SIG-B field may different from channel bandwidth used for PPDU transmission or from MIMO transmission types (MU-MIMO or SU-MIMO).

In a system supporting MU-MIMO, in order to transmit PPDUs having the same size to STAs paired with an AP, information indicating the size of the bits of a data field forming the PPDU and/or information indicating the size of bit streams forming a specific field may be included in the VHT-SIG-A field.

In this case, an L-SIG field may be used to effectively use a PPDU format. A length field and a rate field which are included in the L-SIG field and transmitted so that PPDUs having the same size are transmitted to all of STAs may be used to provide required information. In this case, additional padding may be required in the physical layer because an MAC protocol data unit (MPDU) and/or an aggregate MAC PDU (A-MPDU) are set based on the bytes (or octets) of the MAC layer.

In FIG. 4, the data field is a payload and may include a service field, a scrambled PSDU, tail bits, and padding bits.

An STA needs to determine the format of a received PPDU because several formats of PPDUs are mixed and used as described above.

In this case, the meaning that a PPDU (or a PPDU format) is determined may be various. For example, the meaning that a PPDU is determined may include determining whether a received PPDU is a PPDU capable of being decoded (or interpreted) by an STA. Furthermore, the meaning that a PPDU is determined may include determining whether a received PPDU is a PPDU capable of being supported by an STA. Furthermore, the meaning that a PPDU is determined may include determining that information transmitted through a received PPDU is which information.

This is described in more detail with reference to FIG. 5.

FIG. 5 is a diagram illustrating a constellation for classifying the format of a PPDU in a wireless communication system to which an embodiment of the present invention may be applied.

FIG. 5(a) illustrates the constellation of an L-SIG field included in a non-HT format PPDU, FIG. 5(b) illustrates phase rotation for HT mixed format PPDU detection, and FIG. 5(c) illustrates phase rotation for VHT format PPDU detection.

In order to determine a non-HT format PPDU, an HT-GF format PPDU, an HT mixed format PPDU, and a VHT format PPDU, an STA uses an L-SIG field and the phase of the constellation of OFDM symbols transmitted after the L-SIG field. That is, the STA may determine a PPDU format based on the L-SIG field of the received PPDU and/or the phase of the constellation of OFDM symbols transmitted after the L-SIG field.

Referring to FIG. 5(a), binary phase shift keying (BPSK) is used as OFDM symbols forming an L-SIG field.

First, in order to determine an HT-GF format PPDU, an STA determines whether a detected SIG field is an L-SIG field when the first SIG field is detected in a received PPDU. That is, the STA attempts decoding based on a constellation, such as the example of FIG. 5(a). When the decoding fails, the STA may determine a corresponding PPDU to be not an HT-GF format PPDU.

Next, in order to determine a non-HT format PPDU, an HT mixed format PPDU, and a VHT format PPDU, the phase of the constellation of OFDM symbols transmitted after the L-SIG field may be used. That is, a method for modulating the OFDM symbols transmitted after the L-SIG field may be different. An STA may determine a PPDU format based on a modulation method for a field after the L-SIG field of the received PPDU.

Referring to FIG. 5(b), in order to determine an HT mixed format PPDU, the phases of two OFDM symbols transmitted after the L-SIG field in the HT mixed format PPDU may be used.

More specifically, the phases of an OFDM symbol #1 and OFDM symbol #2 corresponding to an HT-SIG field transmitted after the L-SIG field in the HT mixed format PPDU are counterclockwise rotated 90 degrees. That is, quadrature binary phase shift keying (QBPSK) is used as a method for modulating the OFDM symbol #1 and the OFDM symbol #2. A QBPSK constellation may be a constellation whose phase has been counterclockwise rotated 90 degrees based on a BPSK constellation.

An STA attempts decoding for a first OFDM symbol and second OFDM symbol corresponding to an HT-SIG field transmitted after the L-SIG field of the received PPDU based on a constellation, such as the example of FIG. 5(b). If the decoding is successful, the STA determines that the corresponding PPDU is an HT format PPDU.

Next, in order to determine a non-HT format PPDU and a VHT format PPDU, the phase of the constellation of OFDM symbols transmitted after the L-SIG field may be used.

Referring to FIG. 5(c), in order to determine a VHT format PPDU, the phases of two OFDM symbols transmitted after the L-SIG field in the VHT format PPDU may be used.

More specifically, the phase of an OFDM symbol #1 corresponding to a VHT-SIG-A field after the L-SIG field in the VHT format PPDU is not rotated, but the phase of an OFDM symbol #2 is counterclockwise rotated 90 degrees. That is, BPSK is used as a modulation method for the OFDM symbol #1, and QBPSK is used as a modulation method for the OFDM symbol #2.

An STA attempts decoding for the first OFDM symbol and second OFDM symbol corresponding to the VHT-SIG field transmitted after the L-SIG field of the received PPDU based on a constellation, such as the example of FIG. 5(c). If the decoding is successful, the STA may determine that the corresponding PPDU is a VHT format PPDU.

In contrast, if the decoding fails, the STA may determine the corresponding PPDU is a non-HT format PPDU.

MAC Frame Format

FIG. 6 illustrates the format of an MAC frame for an IEEE 802.11 system to which an embodiment of the present invention may be applied.

Referring to FIG. 6, the MAC frame (i.e., an MPDU) includes an MAC header, a frame body, and a frame check sequence (FCS).

The MAC Header is defined as an area, including a frame control field, a duration/ID field, an address 1 field, an address 2 field, an address 3 field, a sequence control field, an address 4 field, a QoS control field, and an HT control field.

The frame control field includes information about the characteristics of a corresponding MAC frame. The frame control field is described in more detail later.

The duration/ID field may be implemented to have a different value depending on the type and subtype of a corresponding MAC frame.

If the type and subtype of a corresponding MAC frame is a PS-poll frame for a power save (PS) operation, the duration/ID field may be configured to include the association identifier (AID) of an STA that has transmitted the frame. In the remaining cases, the duration/ID field may be configured to have a specific duration value depending on the type and subtype of a corresponding MAC frame. Furthermore, if a frame is an MPDU included in an aggregate-MPDU (A-MPDU) format, the duration/ID field included in an MAC header may be configured to have the same value.

The address 1 field to the address 4 field are used to indicate a BSSID, a source address (SA), a destination address (DA), a transmitting address (TA) indicating the address of a transmitting STA, and a receiving address (RA) indicating the address of a receiving STA.

An address field implemented as a TA field may be set as a bandwidth signaling TA value. In this case, the TA field may indicate that a corresponding MAC frame includes additional information in a scrambling sequence. The bandwidth signaling TA may be represented as the MAC address of an STA that sends a corresponding MAC frame, but individual/group bits included in the MAC address may be set as a specific value (e.g., "1").

The sequence control field is configured to include a sequence number and a fragment number. The sequence number may indicate a sequence number assigned to a corresponding MAC frame. The fragment number may indicate the number of each fragment of a corresponding MAC frame.

The QoS control field includes information related to QoS. The QoS control field may be included if it indicates a QoS data frame in a subtype subfield.

The HT control field includes control information related to an HT and/or VHT transmission/reception scheme. The HT control field is included in a control wrapper frame.

Furthermore, the HT control field is present in a QoS data frame having an order subfield value of 1 and a management frame.

The frame body is defined as an MAC payload. Data to be transmitted in a higher layer is placed in the frame body. The frame body has a varying size. For example, a maximum size of an MPDU may be 11454 octets, and a maximum size of a PPDU may be 5.484 ms.

The FCS is defined as an MAC footer and used for the error search of an MAC frame.

The first three fields (i.e., the frame control field, the duration/ID field, and Address 1 field) and the last field (i.e., the FCS field) form a minimum frame format and are present in all of frames. The remaining fields may be present only in a specific frame type.

FIG. 7 is a diagram illustrating a frame control field within an MAC frame in a wireless communication system to which an embodiment of the present invention may be applied.

Referring to FIG. 7, the frame control field includes a protocol version subfield, a type subfield, a subtype subfield, a To DS subfield, a From DS subfield, a more fragments subfield, a retry subfield, a power management subfield, a more data subfield, a protected frame subfield, and an order subfield.

The protocol version subfield may indicate the version of a WLAN protocol applied to a corresponding MAC frame.

The type subfield and the subtype subfield may be configured to indicate information to identify the function of a corresponding MAC frame.

The type of an MAC frame may include three frame types: a management frame, a control frame, and a data frame.

Furthermore, each of the frame types may be divided into subtypes.

For example, the control frames may include a request to send (RTS) frame, a clear-to-send (CTS) frame, an acknowledgment (ACK) frame, a PS-poll frame, a contention free (CF)-end frame, a CF-end+CF-ACK frame, a block acknowledgment (ACK) request (BAR) frame, a block acknowledgment (ACK) (BA) frame, a control wrapper (control+HT control) frame, a VHT null data packet announcement (NDPA) frame, and a beamforming report poll frame.

The management frames may include a beacon frame, an announcement traffic indication message (ATIM) frame, a disassociation frame, an association request/response frame, a reassociation request/response frame, a probe request/response frame, an authentication frame, a deauthentication frame, an action frame, an action no ACK frame, and a timing advertisement frame.

The To DS subfield and the From DS subfield may include information required to interpret an Address 1 field to an Address 4 field included in the header of a corresponding MAC frame. In the case of a control frame, both the To DS subfield and the From DS subfield are set to "0." In the case of the management frame, the To DS subfield and the From DS subfield may be sequentially set to "1" and "0" if a corresponding frame is a QoS management frame (QMF), and may be sequentially set to "0" and "0" if a corresponding frame is not a QMF.

The More Fragments subfield may indicate whether a fragment to be transmitted after a corresponding MAC frame is present. The More Fragments subfield may be set to "1" if another fragment of a current MSDU or MMPDU is present, and may be set to "0" if another fragment of a current MSDU or MMPDU is not present.

The retry subfield may indicate whether a corresponding MAC frame is based on the retransmission of a previous MAC frame. The retry subfield may be set to "1" if a corresponding MAC frame is based on the retransmission of a previous MAC frame, and may be set to "0" if a corresponding MAC frame is not based on the retransmission of a previous MAC frame.

The power management subfield may indicate power management mode of an STA. If the value of the power management subfield is "1", it may indicate that an STA should switch to power save mode.

The more data subfield may indicate whether an MAC frame to be additionally transmitted is present. The more data subfield may be set to "1" if an MAC frame to be additionally transmitted is present, and may be set to "0" if an MAC frame to be additionally transmitted is not present.

The protected frame subfield may indicate whether a frame body field has been encrypted. The protected frame subfield may be set to "1" if the frame body field includes information processed by a cryptographic encapsulation algorithm, and may be set to "0" if the frame body field does not include information processed by a cryptographic encapsulation algorithm.

The pieces of information included in each of the aforementioned fields may comply with the definition of the IEEE 802.11 system. Furthermore, each of the aforementioned fields corresponds to an example of fields which may be included in an MAC frame, but the present invention is not limited thereto. That is, each of the aforementioned fields may be substituted with another field or may further include an additional field, and all of the fields may not be essentially included.

FIG. 8 illustrates the HT format of an HT control field in the MAC frame of FIG. 6.

Referring to FIG. 8, the HT control field may include a VHT subfield, an HT control middle subfield, an AC constraint subfield, and a reverse direction grant (RDG)/more PPDU subfield.

The VHT subfield indicates whether the HT control field has the format of an HT control field for VHT (VHT=1) or has the format of an HT control field for HT (VHT=0).

In FIG. 8, it is assumed that the HT control field is an HT control field for VHT (i.e., VHT=1). The HT control field for VHT may be called a VHT control field.

The HT control middle subfield may be implemented to a different format depending on the indication of a VHT subfield. The HT control middle subfield is described in detail later.

The AC constraint subfield indicates whether the mapped access category (AC) of a reverse direction (RD) data frame is constrained to a single AC.

The RDG/more PPDU subfield may be differently interpreted depending on whether a corresponding field is transmitted by an RD initiator or an RD responder.

Assuming that a corresponding field is transmitted by an RD initiator, the RDG/more PPDU subfield is set to "1" if an RDG is present, and the RDG/more PPDU subfield is set to "0" if an RDG is not present. Assuming that a corresponding field is transmitted by an RD responder, the RDG/more PPDU subfield is set to "1" if a PPDU including the corresponding subfield is the last frame transmitted by the RD responder, and the RDG/more PPDU subfield is set to "0" if another PPDU is transmitted.

The HT control middle subfield of an HT control field for HT may include a link adaptation subfield, a calibration position subfield, a calibration sequence subfield, a reserved subfield, a channel state information (CSI)/steering subfield, an HT null data packet (NDP) announcement subfield, and a reserved subfield.

The link adaptation subfield may include a training request (TRQ) subfield, a modulation and coding scheme (MCS) request or antenna selection indication (ASEL) (MAI) subfield, an MCS feedback sequence identifier (MFSI) subfield, and an MCS feedback and antenna selection command/data (MFB/ASELC) subfield.

The TRQ subfield may be set to "1" if the transmission of a sounding PPDU is requested from a responder, and may be set to "0" if the transmission of a sounding PPDU is not requested from a responder.

If the MAI subfield is set to 14, it indicates an ASEL indication, and the MFB/ASELC subfield is interpreted as an antenna selection command/data. If not, the MAI subfield indicates an MCS request, and the MFB/ASELC subfield is interpreted as MCS feedback.

If the MAI subfield indicates an MCS request (MRQ), the MAI subfield is interpreted as including an MCS request (MRQ) and an MRQ sequence identifier (MSI). The MRQ subfield is set to "1" if MCS feedback is requested, and is set to "0" if MCS feedback is not requested. When the MRQ subfield is "1", the MSI subfield includes a sequence number for specifying an MCS feedback request. When the MRQ subfield is "0", the MSI subfield is set as reserved bits.

Each of the aforementioned subfields corresponds to an example of subfields which may be included in the HT control field, and may be substituted with another subfield or may further include an additional subfield.

FIG. 9 illustrates the VHT format of an HT control field in a wireless communication system to which an embodiment of the present invention may be applied.

Referring to FIG. 9, the HT control field may include a VHT subfield, an HT control middle subfield, an AC constraint subfield, and a reverse direction grant (RDG)/more PPDU subfield.

In FIG. 9, an HT control field for VHT (i.e., VHT=1) is assumed and described. The HT control field for VHT may be denoted as a VHT control field.

A description of the AC constraint subfield and the RDG/More PPDU subfield is the same as that described with reference to FIG. 8 and is omitted.

As described above, the HT control middle subfield may be implemented to a different format depending on the indication of a VHT subfield.

The HT control middle subfield of an HT control field for VHT may include a reserved bit subfield, a modulation and coding scheme (MCS) feedback request (MRQ) subfield, an MRQ sequence identifier (MSI)/space-time block coding (STBC) subfield, an MCS feedback sequence identifier (MFSI)/least significant bit (LSB) of group ID (GID-L) subfield, an MCS feedback (MFB) subfield, a most significant Bit (MSB) of group ID (GID-H) subfield, a coding type subfield, a feedback transmission type (FB Tx type) subfield, and an unsolicited MFB subfield.

Furthermore, the MFB subfield may include the number of VHT space time streams (NUM_STS) subfield, a VHT-MCS subfield, a bandwidth (BW) subfield, and a signal to noise ratio (SNR) subfield.

The NUM STS subfield indicates the number of recommended spatial streams. The VHT-MCS subfield indicates a recommended MCS. The BW subfield indicates bandwidth information related to a recommended MCS. The SNR subfield indicates an average SNR value of data subcarriers and spatial streams.

The information included in each of the aforementioned fields may comply with the definition of an IEEE 802.11 system. Furthermore, each of the aforementioned fields corresponds to an example of fields which may be included in an MAC frame and is not limited thereto. That is, each of the aforementioned fields may be substituted with another field or may further include additional fields, and all of the fields may not be essentially included.

Link Setup Procedure

FIG. 10 is a diagram illustrating a common uplink setup procedure in a wireless communication system to which an embodiment of the present invention may be applied.

In order to set up a link with a network and to transmit/receive data, first, an STA may experience a scanning procedure for discovering the network, an authentication procedure, an association procedure, etc. Such a link setup procedure may also be called a session initiation procedure or a session setup procedure. Furthermore, the scanning, authentication, and association procedures of the link setup procedure may be generally called an association procedure.

In a WLAN, a scanning procedure includes a passive scanning procedure and an active scanning procedure.

FIG. 10(a) illustrates a link setup procedure according to passive scanning, and FIG. 10(b) illustrates a link setup procedure according to active scanning.

As shown in FIG. 10(a), the passive scanning procedure is performed through a beacon frame that is periodically broadcasted by an AP. The beacon frame is one of management frames in IEEE 802.11, and provides notification of the presence of a wireless network. The beacon frame is periodically (e.g., at an interval of 100 msec) broadcasted so that a non-AP STA performing scanning discovers a wireless network and participates in the wireless network. Information about a current network (e.g., information about a BSS) is carried on the beacon frame.

In order to obtain information about a network, a non-AP STA waits for the reception of a beacon frame while passively moving to channels. The non-AP STA that has received the beacon frame may store information about a network, included in the received beacon frame, may move to a next channel, and may perform scanning in a next channel using the same method. When the non-AP STA receives the beacon frame and obtains the information about the network, a scanning procedure in a corresponding channel is completed.

The passive scanning procedure is advantageous in that overall overhead is small because the passive scanning procedure is completed if a non-AP STA has only to receive a beacon frame without a need to transmit another frame as described above. However, the passive scanning procedure is disadvantageous in that the time taken for a non-AP STA to perform scanning is increased in proportion to the period in which a beacon frame is transmitted.

In contrast, in an active scanning procedure, such as that of FIG. 10(b), in order to discover that what AP is present nearby, a non-AP STA broadcasts a probe request frame while actively moving to channels, and requests network information from all of APs that have received the probe request frame.

A responder that has received a probe request frame waits for a random time in order to prevent a frame collision, carries network information on a probe response frame, and transmits the probe response frame to a corresponding non-AP STA. The non-AP STA that has received the probe response frame may store network-related information included in the received probe response frame, may move to a next channel, and may perform scanning using the same method. When the non-AP STA receives the probe response frame and obtains the network information, a scanning procedure is completed.

The active scanning procedure is advantageous in that scanning can be rapidly completed compared to the passive scanning procedure, but overall network overhead is increased because an additional frame sequence is required.

The non-AP STA that has completed the scanning procedure selects a network based on its own criterion and performs an authentication procedure along with a corresponding AP.

The authentication procedure is performed by a process in which the non-AP STA transmits an authentication request frame to the AP and a process in which the AP transmits an authentication response frame to the non-AP STA in response to the authentication request frame, that is, through 2-way handshaking.

The authentication frame used in the authentication request/response frame corresponds to the management frame.

The authentication frame may include information about an authentication algorithm number, an authentication transaction sequence number, a status code, challenge text, a robust security network (RSN), a finite cyclic group, etc. Such information corresponds to an example of some of pieces of information which may be included in the authentication request/response frame and may be substituted with another piece of information or may further include additional information.

The non-AP STA may transmit an authentication request frame to the AP. The AP may determine whether or not to permit authentication for the non-AP STA based on information included in the received authentication request frame. The AP may provide the results of the processing of the authentication to the non-AP STA through an authentication response frame.

The non-AP STA and the AP perform mutual authentication through the authentication procedure and then establish association.

The association process is performed by a process in which the non-AP STA transmits an association request frame to the AP and a process in which the AP transmits an association response frame to the non-AP STA in response to the association request frame, that is, through 2-way handshaking.

The association request frame may include information related to various capabilities of the non-AP STA and information about a beacon listen interval, a service set identifier (SSID), supported rates, supported channels, an RSN, a mobility domain, supported operating classes, a traffic indication map (TIM) broadcast request, an interworking service capabilities, etc.

The AP determines whether the non-AP STA can be supported based on the information. After the determination, the AP includes information about whether the association request has been accepted or not, a reason for the acceptance or rejection of the association request, and capability information of the AP in an association response frame, and transmits the association response frame to the non-AP STA.

The association response frame may include information related to various capabilities and information, such as status code, an association ID (AID), supported rates, an enhanced distributed channel access (EDCA) parameter set, a received channel power indicator (RCPI), a received signal to noise indicator (RSNI), a mobility domain, a timeout interval (or an association comeback time), an overlap BSS scan parameter, a TIM broadcast response, a quality of service (QoS) map, etc.

The pieces of information which may be included in the aforementioned association request/response frame correspond to examples and may be substituted with other pieces of information or may further include additional information.

When the non-AP STA and the AP successfully establish association, normal transmission/reception is performed. In contrast, if association with the AP is not successfully established, the non-AP STA may attempt the association procedure again or attempt association with another AP based on a corresponding reason.

Medium Access Mechanism

In IEEE 802.11, communication is basically different from that of a wired channel environment because it is performed in a shared wireless medium.

In a wired channel environment, communication is possible based on carrier sense multiple access/collision detection (CSMA/CD). For example, when a signal is once transmitted by a transmission stage, it is transmitted up to a reception stage without experiencing great signal attenuation because there is no great change in a channel environment. In this case, when a collision between two or more signals is detected, detection is possible. The reason for this is that power detected by the reception stage becomes instantly higher than power transmitted by the transmission stage. In a radio channel environment, however, since various factors (e.g., signal attenuation is great depending on the distance or instant deep fading may be generated) affect a channel, a transmission stage is unable to accurately perform carrier sensing regarding whether a signal has been correctly transmitted by a reception stage or a collision has been generated.

Accordingly, in a WLAN system according to IEEE 802.11, a carrier sense multiple access with collision avoidance (CSMA/CA) mechanism has been introduced as the basic access mechanism of MAC. The CAMA/CA mechanism is also called a distributed coordination function (DCF) of IEEE 802.11 MAC, and basically adopts a "listen before talk" access mechanism. In accordance with such a type of access mechanism, an AP and/or an STA perform clear channel assessment (CCA) for sensing a radio channel or a medium for a specific time interval (e.g., a DCF inter-frame space (DIFS)) prior to transmission. If, as a result of the sensing, the medium is determined to be an idle state, the AP and/or the STA starts to transmit a frame through the corresponding medium. In contrast, if, as a result of the sensing, the medium is determined to be a busy state (or an occupied status), the AP and/or the STA do not start their transmission, may wait for a delay time (e.g., a random backoff period) for medium access in addition to the DIFS assuming that several STAs already wait for in order to use the corresponding medium, and may then attempt frame transmission.

Assuming that several STAs trying to transmit frames are present, they will wait for different times because the STAs stochastically have different backoff period values and will attempt frame transmission. In this case, a collision can be minimized by applying the random backoff period.

Furthermore, the IEEE 802.11 MAC protocol provides a hybrid coordination function (HCF). The HCF is based on a DCF and a point coordination function (PCF). The PCF is a polling-based synchronous access method, and refers to a method for periodically performing polling so that all of receiving APs and/or STAs can receive a data frame. Furthermore, the HCF has enhanced distributed channel access (EDCA) and HCF controlled channel access (HCCA). In EDCA, a provider performs an access method for providing a data frame to multiple users on a contention basis. In HCCA, a non-contention-based channel access method using a polling mechanism is used. Furthermore, the HCF includes a medium access mechanism for improving the quality of service (QoS) of a WLAN, and may transmit QoS data in both a contention period (CP) and a contention-free period (CFP).

FIG. 11 is a diagram illustrating a random backoff period and a frame transmission procedure in a wireless communication system to which an embodiment of the present invention may be applied.

When a specific medium switches from an occupied (or busy) state to an idle state, several STAs may attempt to transmit data (or frames). In this case, as a scheme for minimizing a collision, each of the STAs may select a random backoff count, may wait for a slot time corresponding to the selected random backoff count, and may attempt transmission. The random backoff count has a pseudo-random integer value and may be determined as one of uniformly distributed values in 0 to a contention window (CW) range. In this case, the CW is a CW parameter value. In the CW parameter, CW_min is given as an initial value. If transmission fails (e.g., if ACK for a transmitted frame is not received), the CW_min may have a twice value. If the CW parameter becomes CW_max, it may maintain the CW_max value until data transmission is successful, and the data transmission may be attempted. If the data transmission is successful, the CW parameter is reset to a CW_min value. The CW, CW_min, and CW_max values may be set to $2^n-1$ (n=0, 1, 2, . . . , ).

When a random backoff process starts, an STA counts down a backoff slot based on a determined backoff count value and continues to monitor a medium during the countdown. When the medium is monitored as a busy state, the STA stops the countdown and waits. When the medium becomes an idle state, the STA resumes the countdown.

In the example of FIG. 11, when a packet to be transmitted in the MAC of an STA 3 is reached, the STA 3 may check that a medium is an idle state by a DIFS and may immediately transmit a frame.

The remaining STAs monitor that the medium is the busy state and wait. In the meantime, data to be transmitted by each of an STA 1, an STA 2, and an STA 5 may be generated. When the medium is monitored as an idle state, each of the STAs waits for a DIFS and counts down a backoff slot based on each selected random backoff count value.

The example of FIG. 11 shows that the STA 2 has selected the smallest backoff count value and the STA 1 has selected the greatest backoff count value. That is, FIG. 11 illustrates that the remaining backoff time of the STA 5 is shorter than the remaining backoff time of the STA 1 at a point of time at which the STA 2 finishes a backoff count and starts frame transmission.

The STA 1 and the STA 5 stop countdown and wait while the STA 2 occupies the medium. When the occupation of the medium by the STA is finished and the medium becomes an idle state again, each of the STA 1 and the STA 5 waits for a DIFS and resumes the stopped backoff count. That is, each of the STA 1 and the STA 5 may start frame transmission after counting down the remaining backoff slot corresponding to the remaining backoff time. The STA 5 starts frame transmission because the STA 5 has a shorter remaining backoff time than the STA 1.

While the STA 2 occupies the medium, data to be transmitted by an STA 4 may be generated. In this case, from a standpoint of the STA 4, when the medium becomes an idle state, the STA 4 waits for a DIFS and counts down a backoff slot corresponding to its selected random backoff count value.

FIG. 11 shows an example in which the remaining backoff time of the STA 5 coincides with the random backoff count value of the STA 4. In this case, a collision may be generated between the STA 4 and the STA 5. When a collision is generated, both the STA 4 and the STA 5 do not receive ACK, so data transmission fails. In this case, each of the STA 4 and the STA 5 doubles its CW value, select a random backoff count value, and counts down a backoff slot.

The STA 1 waits while the medium is the busy state due to the transmission of the STA 4 and the STA 5. When the medium becomes an idle state, the STA 1 may wait for a DIFS and start frame transmission after the remaining backoff time elapses.

The CSMA/CA mechanism includes virtual carrier sensing in addition to physical carrier sensing in which an AP and/or an STA directly sense a medium.

Virtual carrier sensing is for supplementing a problem which may be generated in terms of medium access, such as a hidden node problem. For the virtual carrier sensing, the MAC of a WLAN system uses a network allocation vector (NAV). The NAV is a value indicated by an AP and/or an STA which now uses a medium or has the right to use the medium in order to notify another AP and/or STA of the remaining time until the medium becomes an available state. Accordingly, a value set as the NAV corresponds to the period in which a medium is reserved to be used by an AP and/or an STA that transmit corresponding frames. An STA that receives an NAV value is prohibited from accessing the medium during the corresponding period. The NAV may be set based on the value of the duration field of the MAC header of a frame, for example.

Furthermore, in order to reduce the collision possibility, a robust collision detection mechanism has been introduced. This is described below with reference to FIGS. 12 and 13. An actual carrier sensing range and a transmission range may be the same, but are assumed to be the same, for convenience of description.

FIG. 12 is a diagram illustrating a hidden node and an exposed node in a wireless communication system to which an embodiment of the present invention may be applied.

FIG. 12(a) illustrates a hidden node and shows an example in which an STA A and an STA B are communicating with each other and an STA C has information to be transmitted. More specifically, the STA A transmits information to the STA B, but when the STA C performs carrier sensing before transmitting data to the STA B, it may determine a medium to be an idle state. The reason for this is that the transmission (i.e., the medium occupied) of the STA A may not be sensed at the location of the STA C. In this case, a collision is generated because the STA B receives information from the STA A and the STA C at the same time. In this case, the STA A may be called a hidden node of the STA C.

FIG. 12(b) illustrates an exposed node and shows an example in which while an STA B transmits data to an STA A, an STA C has information to be transmitted to an STA D. In this case, if the STA C performs carrier sensing, it may determine that a medium has been occupied due to the transmission of the STA B. Accordingly, the STA C has to wait until the medium becomes an idle state because the medium is sensed as being a busy state although the STA C has information to be transmitted to the STA D. However, since the STA A is out of the transmission range of the STA C, the transmission of the STA C and the transmission of the STA B may not collide against each other form a standpoint of the STA A. As a result, the STA C unnecessarily waits until the STA B stops transmission. In this case, the STA C may be called an exposed node of the STA B.

FIG. 13 is a diagram illustrating an RTS and a CTS in a wireless communication system to which an embodiment of the present invention may be applied.

In exemplary situations, such as those of FIG. 12, in order to efficiently use a collision avoidance mechanism, short signaling packets, such as request to send (RTS) and clear to send (CTS), may be used. RTS/CTS between two STAs enable surrounding STA(s) to perform overhearing. Accordingly, the surrounding STA(s) may take into consideration whether they will transmit information therebetween.

An AP and/or an STA may perform a procedure for exchanging a request to send (RTS) frame and a clear to send (CTS) frame in order to provide notification that they will access a medium. The RTS frame and the CTS frame include information indicating a temporal section in which a wireless medium required to transmit/receive an ACK frame has been reserved to be accessed if substantial data frame transmission and an acknowledgement response (ACK) are supported. Another STA which has received an RTS frame from an AP and/or an STA attempting to send a frame or which has received a CTS frame transmitted by an STA to which a frame will be transmitted may be configured to not access a medium during a temporal section indicated by information included in the RTS/CTS frame. This may be implemented by setting the NAV during a time interval.

FIG. 13(a) shows an example of a method for solving a hidden node problem. It is assumed that both an STA A and an STA C try to transmit data to an STA B. When the STA A transmits RTS to the STA B, the STA B transmits CTS to both the STA A and the STA C around the STA A. As a result, the STA C waits until the data transmission of the STA A and the STA B is terminated, thereby being capable of avoiding a collision.

FIG. 13(b) shows an example of a method for solving an exposed node problem. An STA C may determine that a collision will not be generated although it transmits data to another STA (e.g., an STA D) by overhearing RTS/CTS transmission between an STA A and an STA B. That is, the STA B transmits RTS to all of surrounding STAs and transmits CTS to only the STA A having data to be actually transmitted. Since the STA C has received only RTS, but has not received the CTS of the STA A, it may be aware that the STA A is out of the carrier sensing of the STC C.

HE System

The next-generation WLAN system is described below. The next-generation WLAN system is the next-generation Wi-Fi system. For example, IEEE 802.11ax may be described as an embodiment of such a next-generation Wi-Fi system. In this specification, the following next-generation WLAN system is called a high efficiency (HE) system. The frame, PPDU, etc. of the HE system may be referred to as an HE frame, an HE PPDU, an HE-SIG field, an HE-STF, an HE-LTF, etc.

A description of an existing WLAN system, such as the aforementioned VOT system, may be applied to contents that are not further described below with respect to the HE system. For example, the descriptions of the aforementioned VHT-SIG A field, VHT-STF, VHT-LTF, and VHT-SIG-B field may be applied to the HE-SIG A field, the HE-STF, the HE-LTF, and the HE-SIG-B field. The HE frame, preamble, etc. of the proposed HE system may be used in other wireless communication or cellular systems. An HE STA may be a non-AP STA or an AP STA as described above. In the following specification, although an STA is described, such an STA apparatus may indicate an HE STA apparatus.

The HE-SIG A field includes common control information that is transmitted to STAs receiving a PPDU in common. The HE-SIG A field may be transmitted in one to three OFDM symbols. The HE-SIG A field may be copied in a 20 MHz unit and may include the same information. Furthermore, the HE-SIG-A field provides notification of information about the entire bandwidth of a system. In an embodiment, the HE-SIG A field may include at least one of bandwidth information, group ID information, stream information, UL indication information, guard interval (GI) indication information, allocation information, and transmit power information.

The HE-SIG B field may include user-specific information that is necessary for each STA to receive its data (e.g., a PSDU). The HE-SIG B field may be transmitted in one or two OFDM symbols. For example, the HE-SIG B field may include information about the modulation and coding scheme (MCS) of a corresponding PSDU and the length of the corresponding PSDU.

Furthermore, in the HE system, an FFT size that is four times greater than that of an existing WLAN system is to be used for average throughput enhancement and outdoor robust transmission). If the 4× FFT scheme is applied, the symbol interval of a symbol to which the 4× FFT scheme has been applied becomes four times. If an 4× FFT size is used, the interval of one symbol may become four times because the interval between subcarriers becomes ¼ in an embodiment in which the entire bandwidth is constantly used and subcarrier spacing of ¼ times is used.

Furthermore, a 1× FFT size, that is, a basis for the 4× FFT size, may be the FFT size of a VHT system (IEEE 802.11ac). Accordingly, the 1× FFT size, that is, a basis for the 4× FFT size, may correspond to the FFT size of a legacy preamble portion (an L-STF, an L-LTF, and an L-SIG field). The interval of one preamble for 1× FFT may be represented by the interval in which an IDFT/DFT interval of 3.2 us and the interval of a GI symbol are added. The interval of one preamble for 1× FFT may be 4 μs (3.2+0.8) in the case of a long GI interval and may be 3.6 μs (3.2+0, 4) in the case of a short GI interval. The symbol interval of a data portion is 3.2 μs. Accordingly, one symbol interval may be 12.8 μs if the 4× FFT scheme is applied in the HE system. Alternatively, the symbol interval of the data portion may be represented by 12.8 μs, that is, the four times of the IDFT/DFT interval.

In the HE system, an orthogonal frequency division multiple access (OFDMA) scheme may be used in order to transmit and receive more data to and from a plurality of STAs at the same time. OFDMA is the multi-user version of an OFDM digital modulation scheme. The OFDMA scheme indicates a method in which multiple carriers according to the OFDM scheme, that is, subcarriers, are not exclusively possessed by one user, but a subset of the subcarriers is allocated to each of the plurality of users and is used by each user. A subcarrier used in OFDMA, that is, a subcarrier, may be called a tone. Tone plans in which such tones will be allocated in what unit and in this case, how a pilot signal will be disposed with respect to the allocation of each tone size are proposed below.

In the case of an 802.11ac system, a signal may be transmitted using a 20 MHz, 40 MHz, 80 MHz, or 160 MHz (80 MHz+80 MHz) bandwidth. In this case, the numbers and positions of pilot tones inserted into a subcarrier are as follows.

In the case of 20 MHz bandwidth transmission, 4 pilot tones are inserted, and the 4 pilot tones may be placed at the indices of {−21, −7, 7, 21}. In the case of 40 MHz bandwidth transmission, 6 pilot tones are inserted, and the 6 pilot tones may be placed at the indices of {−53, −25, −11, 11, 25, 53}. In the case of 80 MHz bandwidth transmission, 8 pilot tones are inserted, and the 8 pilot tones may be placed at the indices of {−103, −75, −39, −11, 11, 39, 75, 103}. Furthermore, in the case of 160 MHz bandwidth transmission, 16 pilot tones are inserted, and the 16 pilot tones may be placed at the indices of {−231, −203, −167, −139, −117, −89, −53, −25, 25, 53, 89, 117, 139, 167, 203, 231}.

If an 4× FFT size and OFDMA are applied, it is difficult to apply the deployment of the pilots of an 802.11ac system without any change. Hereinafter, pilot positions in which tones increased due to the application of an 4× FFT size are allocated in a plurality of tone-unit units for use of OFDMA and a pilot structure satisfies symmetry to a maximum extent for each tone-unit are proposed.

First, in an embodiment of the present invention, the tone size of a basic unit to be used in OFDMA and the number of pilots to be used in a corresponding unit are defined. The block of a 26 tone size, the block of a 52 tone size, the block of a 108 tone size, and the block of a 242 tone size are proposed as the basic units.

1) 26 Tone-Unit

If OFDMA is used, there is proposed the use of a subblock of the 26 tone size as a minimum unit of subcarrier allocation. 26 tones are the same as the number of tones used in 1 MHz of the existing 802.11 system, and thus the 26 tone-unit may be designed to include two pilot tones by taking into consideration system compatibility.

2) 52 Tone-Unit

If OFDMA is used, there is proposed the use of a subblock of the 52 tone size, that is, the sum of two 26 tone-units, as a unit of subcarrier allocation. 52 tones are the same as the number of tones used in 20 MHz of the existing 802.11 system, and thus the 52 tone-unit may be designed to include 4 pilot tones by taking into consideration system compatibility.

3) 108 Tone-Unit

If OFDMA is used, there is proposed the use of a subblock of the 108 tone size, that is, the sum of four 26 tone-units and four leftover tones, as a unit of subcarrier allocation. The 108 tone-unit may be designed to include 6 pilot tones. In this case, there is an advantage in that the 40 MHz interleaver of the existing 802.11 system can be used with a slight change.

4) 242 Tone-Unit

If OFDMA is used, there is proposed the use of a subblock of the 242 tone size, that is, the sum of nine 26 tone-units and eight leftover tones, as a unit of subcarrier allocation. 242 tones are the same as the number of tones used in 80 MHz of the existing 802.11 system, and thus the 242 tone-unit may be designed to include 8 pilot tones by taking into consideration system compatibility.

Tone plans capable of satisfying the symmetry of pilot positions if the aforementioned OFDMA subblocks are used are described below. The tone plan may indicate the deployment of OFDMA subblocks and pilot tones. Furthermore, the OFDMA subblock is a unit for allocating tones through OFDMA and may also be called a tone-unit.

FIG. 14 shows the OFDMA tone-units of the 52 tone size according to an embodiment of the present invention.

The 52 tone-unit includes two 26 tone-units. Accordingly, the 52 tone-unit always satisfies the symmetry of pilot tones on the basis of DC, that is, the center frequency.

FIG. 15 shows the OFDMA tone-units of the 108 tone size according to an embodiment of the present invention.

The 108 tone-unit includes two 52 tone-units and four leftover tones. A 52 tone-unit may include two 26 tone-units, but the 52 tone-unit satisfies symmetry as shown in FIG. 14. Accordingly, the 52 tone-unit is basically described, for convenience sake.

In the 108 tone-unit, the two 52 tone-units and the four leftover tones need to disposed in order to satisfy symmetry based on the center frequency, as shown in FIG. 15.

In an embodiment, as shown in FIG. 15(*a*), the two 52 tone-units may be disposed on the center frequency side, and two leftover tones may be disposed on each of both sides of the center frequency. In another embodiment, as shown in FIG. 15(*b*), the two 52 tone-units may be placed on both sides, and the four leftover tones may be placed at the center. In another embodiment, as shown in FIG. 15(*c*), two leftover tones may be placed at the center, two leftover tones may be disposed on both sides, respectively, and a 52 tone-unit may be disposed between the two leftover tones.

FIG. 16 shows the OFDMA tone-units of the 242 tone size according to an embodiment of the present invention.

The 242 tone-unit may include two 108 tone-units and one 26 tone-unit. In this case, in order to satisfy symmetry, the 26 tone-unit may be disposed at the center, and the two 108 tone-units may be disposed on both sides of the 26 tone-unit, as shown in FIG. 16.

Furthermore, the 242 tone-unit may include four 52 tone-units, one 26 tone, and eight leftover tones or may include nine 26 tone-units and eight leftover tones. An example in which the 242 tone-unit is configured using 52 tone-units or 26 tone-units is shown in FIG. 17.

FIG. 17 shows the OFDMA tone-units of the 242 tone size according to another embodiment of the present invention.

FIG. 17 shows a method for configuring the 242 tone-unit. In FIGS. 17(*a*) to 17(*c*), a configuration using two 108 tone-units and one 26 tone-unit is the same as that shown in FIG. 16. FIGS. 17(*a*) to 17(*c*) are methods for configuring the 242 tone-unit using 52 tone-units or 26 tone-units and show methods capable of satisfying symmetry.

If 52 tone-units or 25 tone-units are used as shown in FIG. 17(*a*), two leftover tones may be disposed on both sides, respectively, and may be disposed on both sides a 26 tone-unit at the center, respectively. Such a configuration corresponds to an embodiment in which the configuration of the 108 tone-unit of FIG. 15(*a*) is used in the configuration of FIG. 16.

As shown in FIG. 17(*b*), four leftover tones may be disposed between 52 tone-units or two 26 tone-units on both sides of a 26 tone at the center. Such a configuration corresponds to an embodiment in which the configuration of the 108 tone-unit of FIG. 15(b) is used in the configuration of FIG. 16.

As shown in FIG. 17(c), leftover tones may be disposed on both sides, respectively, one left over tone may be disposed on both sides of a 26 tone-unit at the center, two leftover tones may be disposed between 52 tone-units placed on both sides of a 26 tone-unit at the center, and two leftover tones may be disposed between two 26 tone-units. Such a configuration corresponds to an embodiment in which the configuration of the 108 tone-unit of FIG. 15(c) is used in the configuration of FIG. 16.

In accordance with the aforementioned tone plans, the position of pilot tones according to the aforementioned number of pilot tones is described below. The positions of pilot tones are described as indices. For a description, tone indices for each tone size are the same as those of the following table. In Table 1, the index indicates a relative position relation, and an index number itself does not have a unique value. For example, No. 2 in 1~26 indices may correspond to No. 1 in 0~25 indices.

TABLE 1

| | UNIT | | | |
|---|---|---|---|---|
| | 26 TONE-UNIT | 52 TONE-UNIT | 108 TONE-UNIT | 242 TONE-UNIT |
| INDEX | 1~26 | 1~52 | 1~108 | 1~242 |

Furthermore, it is assumed that the position of pilot tones used in each tone-unit is aligned with a 26 tone-unit.

First, in the 26 tone-unit, the position of pilot tones is determined to be {7, 20}, that is, positions, if a guard portion and DC are excluded from the pilot position of 802.11ah 1 MHz. {7, 20} satisfies symmetry within 26 tones. If left and right tones are divided into two 13 tones, {7, 20} are tone indices placed at the center and satisfy an equi-space condition.

In the 52 tone-unit, the position of pilot tones may be determined to be {7, 20, 33, 46} using the position of a 26 tone-unit. This position also has symmetry and good performance from a viewpoint of the equi-space.

The positions of the 26 tone-unit and the 52 tone-unit may be indicated as {a, 27−a} and {a, 27−a, 26+a, 53−a}. "a" is an integer between 1 and 13. The positions of pilot tones according to the tone configurations and the number of pilot tones described with reference to the 108 tone-unit and the 242 tone-unit are described below.

FIG. 18 shows a method for determining the position of pilot tones according to an embodiment of the present invention.

FIG. 18 shows an example in which tone plans, such as those of FIGS. 15(a) and 17(a), are used and shows the candidate indices of pilot tones for a 108 tone-unit and a 242 tone-unit.

1) Positions of Pilot Tones of 108 Tone-Unit

As described above, the position of pilot tones of the 26 tone-unit is {7, 20} (or {a, 27−a}). Accordingly, as shown in FIG. 18, six of 9, 22, 35, 48, 61, 74, 87, and 100 (or 2+a, 29−a, 28+a, 55−a, 54+a, 81−a, 80+a, and 107−a) may be selected and used as the position of pilot tones in the 108 tone-unit. In this case, if 9 and 100, 22 and 87, 35 and 74, and 48 and 61 (or 2+a and 107−a, 29−a and 80+a, 28+a and 81−a, and 55−a and 54+a) are used as pairs together, better performance in symmetry is obtained. Accordingly, one of four sets of {9, 22, 35, 74, 87, 100}, {9, 22, 48, 61, 87, 100}, {9, 35, 48, 61, 74, 100}, and {22, 35, 48, 61, 74, 87} may be determined to be the position of a pilot tone in the 108 tone-unit. This may be represented as four sets, such as {2+a, 29−a, 28+a, 81−a, 80+a, 107−a}, {2+a, 29−a, 55−a, 54+a, 80+a, 107−a}, {2+a, 28+a, 55−a, 54+a, 81−a, 107−a}, and {29−a, 28+a, 55−a, 54+a, 81−a, 80+a}.

In addition, the value "a" optimized for the 108-tone-unit from a viewpoint of the equi-space may be determined. If the 108 tone-unit is divided by 6, that is, the number of pilots, it leads to 18. In the 18 tone-units, if a pilot is disposed at the center, that is, in the ninth or tenth tone, performance may be the best from a viewpoint of the equi-space. From a viewpoint of a minimum distance, a method for using the pilot tones of 2+a, 29−a, and 55−a and the pairs (54+a, 80+a, 107−a) of the pilot tones is proposed. In this case, "2+a" needs to become a value close to 9 or 10, "29−a" needs to become a value close to 27 or 28, and "55−a" needs to become a value close to 45 or 46. That is, pilot positions having the best performance may be determined using the value "a" that satisfies Equation 1 below.

$$\min(\text{abs}(9-(2+a)),\text{abs}(10-(2+a)))+\min(\text{abs}(27-(29-a)),\text{abs}(28-(29-a)))+\min(\text{abs}(45-(55-a)),\text{abs}(46-(55-a)))$$ [Equation 1]

The value "a" that satisfies Equation 1 is determined to be 7 or 8. 7 may be proposed s the value "a" by taking into consideration equi-space performance of the 26 tone-units and the 52 tone-units. In such an embodiment, the position of pilot tones may be determined to be {9, 22, 48, 61, 87, 100}.

2) Positions of Pilot Tones of 242 Tone-Unit

As described above, the position of pilot tones of the 26 tone-unit is {7, 20} (or {a, 27−a}). Accordingly, as shown in FIG. 18, eight of 9, 22, 35, 48, 61, 74, 87, 100, 115, 128, 143, 156, 169, 182, 195, 208, 221, and 234 (or 2+a, 29−a, 28+a, 55−a, 54+a, 81−a, 80+a, 107−a, 108+a, 135−a, 136+a, 163−a, 162+a, 189−a, 188+a, 215−a, 214+a, and 241−a) may be selected and used as the position of pilot tones in the 242 tone-unit. In this case, if 9 and 234, 22 and 221, 35 and 208, 48 and 195, 61 and 182, 74 and 169, 87 and 156, 100 and 143, and 115 and 128 (or 2+a and 241−a, 29−a and 214+a, 28+a and 215−a, 55−a and 188+a, 54+a and 189−a, 81−a and 162+a, 80+a and 163−a, 107−a and 136+a, and 108+a and 135−a) are used as pairs together, better performance in symmetry is obtained. The pairs may be represented as p1, p2, . . . , p9, respectively. All of cases which may be obtained when four of the 9 pairs are picked up without redundancy may be determined to be the position of pilot tones of the 242 tone-unit.

In addition, the value "a" optimized for the 242 tone-unit from a viewpoint of the equi-space may be determined. If the 242 tone-unit is divided by 8, that is, the number of pilots, it leads to about 30. It is assumed that the remaining two tones are disposed at both ends. Accordingly, in the 30 tone-units, if a pilot is disposed at the center, that is, in the fifteenth or the sixteenth tone, performance may be the best from a viewpoint of the equi-space. In this case, the first and the last are 31 tone blocks, and a pilot has only to be disposed in the sixteenth tone of such a block. From a viewpoint of a minimum distance, a method for using the pilot tones of 29−a, 55−a, 81−a, and 107−a and the pairs of the pilot tones is proposed. In this case, "29−a" needs to become a value close to 16, "55−a" needs to become a value close to 46 or 47, "81−a" needs to become a value close to 76 or 77, and "107−a" needs to become a value close to 106 or 107. That is, pilot positions having the best performance may be determined using the value "a" that satisfies Equation 2 below.

$$abs(16-(29-a)+\min(abs(46-(55-a)),abs(47-(55-a)))+\min(abs(76-(81-a)),abs(77-(81-a)))+\min(abs(106-(107-a)),abs(107-(107-a))))$$ [Equation 2]

The value "a" that minimizes Equation 2 is determined to be one of 5 to 8, and 7 is proposed s the value "a" by taking into consideration equi-space performance of the 26 tone-units, the 52 tone-units, and the 108 tone-units. In such an embodiment, the position of pilot tones may be determined to be {22, 48, 74, 100, 143, 169, 195, 221}.

FIG. 19 shows a method for determining the position of pilot tones according to another embodiment of the present invention.

FIG. 19 shows an example in which tone plans, such as those of FIGS. 15(b) and 17(b) are used and shows the candidate indices of pilot tones for a 108 tone-unit and a 242 tone-unit.

1) Positions of Pilot Tones of 108 Tone-Unit

As described above, the position of pilot tones of the 26 tone-unit is {7, 20} (or {a, 27−a}). Accordingly, as shown in FIG. 19, six of 7, 20, 33, 46, 63, 76, 89, and 102 (or a, 27−a, 26+a, 53−a, 56+a, 83−a, 82+a, and 109−a) may be selected and used as the position of pilot tones in the 108 tone-unit. In this case, if 7 and 102, 20 and 89, 33 and 76, and 46 and 63 (or a and 109−a, 27−a and 82+a, 26+a and 83−a, and 53−a and 56+a) are used as pairs together, better performance in symmetry is obtained. Accordingly, the position of pilot tones in the 108 tone-unit may be determined to be one of the four sets of {7, 20, 33, 76, 89, 102}, {7, 20, 46, 63, 89, 102}, {7, 33, 46, 63, 76, 102}, and {20, 33, 46, 63, 76, 89}. The four sets may be represented as four sets, such as {a, 27−a, 26+a, 83−a, 82+a, 109−a}, {a, 27−a, 53−a, 56+a, 82+a, 109−a}, {a, 26+a, 53−a, 56+a, 83−a, 109−a}, and {27−a, 26+a, 53−a, 56+a, 83−a, 82+a}.

In addition, the value "a" optimized for the 108-tone-unit from a viewpoint of the equi-space may be determined. If the 108 tone-unit is divided by 6, that is, the number of pilots, it leads to 18. In the 18 tone-units, if a pilot is disposed at the center, that is, in the ninth or tenth tone, performance may be the best from a viewpoint of the equi-space. A method for using the pilot tones of a, 26+a, and 53−a and the pairs of the pilot tones from a viewpoint of a minimum distance is proposed. In this case, "a" needs to become a value close to 9 or 10, "26+a" needs to become a value close to 27 or 28, and "53−a" needs to become a value close to 45 or 46. That is, pilot positions having the best performance may be determined using the value "a" that satisfies Equation 3 below.

$$\min(abs(9-a),abs(10-a))+\min(abs(27-(26+a)),abs(28-(26+a)))+\min(abs(45-(53-a)),abs(46-(53-a)))$$ [Equation 3]

The value "a" that minimizes Equation 3 is determined to be 7 or 8, and 7 is proposed as the value "a" by taking into consideration equi-space performance of the 26 tone-units and the 52 tone-units. In such an embodiment, the position of pilot tones may be determined to be {7, 33, 46, 63, 76, 102}.

2) Position of Pilot Tones of 242 Tone-Unit

As described above, the position of pilot tones of the 26 tone-unit is {7, 20} (or {a, 27−a}). Accordingly, as shown in FIG. 19, eight of 7, 20, 33, 46, 63, 76, 89, 102, 115, 128, 141, 154, 167, 180, 197, 210, 223, and 236 (or a, 27−a, 26+a, 53−a, 56+a, 83−a, 82+a, 109−a, 108+a, 135−a, 134+a, 161−a, 160+a, 187−a, 190+a, 217−a, 216+a, and 243−a) may be selected and used as the position of pilot tones in the 242 tone-unit. In this case, if 7 and 236, 20 and 223, 33 and 210, 46 and 197, 63 and 180, 76 and 167, 89 and154, 102 and 141, and 115 and 128 (or a and 243−a, 27−a and 216+a, 26+a and 217−a, 53−a and 190+a, 56+a and 187−a, 83−a and 160+a, 82+a and 161−a, 109−a and 134+a, and 108+a and 135−a) are used as pairs together, better performance in symmetry is obtained. The pairs may be represented as p1, p2, . . . , p9, respectively. All of cases which may be obtained when four of the 9 pairs are picked up without redundancy may be determined to be the position of pilot tones of the 242 tone-unit.

In addition, the value "a" optimized for the 242 tone-unit from a viewpoint of the equi-space may be determined. If the 242 tone-unit is divided by 8, that is, the number of pilots, it leads to about 30. It is assumed that the remaining two tones are placed at both ends. Accordingly, if a pilot is placed at the center of the 30 tone-units, that is, in the fifteenth or sixteenth tone, performance may be the best from a viewpoint of the equi-space. However, the first and the last are 31 tone blocks, and thus the pilot has only to be placed at the sixteenth tone of this block. A method for using the pilot tones of 27−a, 53−a, 83−a, and 109−a and the pairs of the pilot tones from a viewpoint of a minimum distance is proposed. In this case, "27−a" needs to become a value close to 16, "53−a" needs to become a value close to 46 or 47, "83-a" needs to become a value close to 76 or 77, and "109-a" needs to become a value close to 106 or 107. That is, pilot positions having the best performance may be determined using the value "a" that satisfies Equation 4 below.

$$abs(16-(29-a)+\min(abs(46-(55-a)),abs(47-(55-a)))+\min(abs(76-(81-a)),abs(77-(81-a)))+\min(abs(106-(107-a)),abs(107-(107-a))))$$ [Equation 4]

The value "a" that minimizes Equation 4 may be determined to be 6 or 7, and 7 is proposed as the value "a" by taking into consideration equi-space performance of the 26 tone-units, the 52 tone-units, and the 108 tone-units. In such an embodiment, the position of pilot tones may be determined to be {20, 46, 76, 102, 141, 167, 197, 223}.

FIG. 20 shows a method for determining the position of pilot tones according to another embodiment of the present invention.

FIG. 20 shows an example in which tone plans, such as those of FIGS. 15(c) and 17(c), are used and shows the candidate indices of pilot tones for the 108 tone-unit and the 242 tone-unit.

1) Position of Pilot Tones of 108 Tone-Unit

As described above, the position of pilot tones of the 26 tone-unit is {7, 20} (or {a, 27−a}). Accordingly, as shown in FIG. 20, six of 8, 21, 34, 47, 62, 75, 88, and 101 (or 1+a, 28−a, 27+a, 54−a, 55+a, 82−a, 81+a, and 108−a) may be selected and used as the position of pilot tones in the 108 tone-unit. In this case, if 8 and 101, 21 and 88, 34 and 75, and 47 and 62 (or 1+a and 108−a, 28−a and 81+a, 27+a and 82−a, and 54−a and 55+a) are used as pairs together, better performance in symmetry is obtained. Accordingly, one of the four sets of {8, 21, 34, 75, 88, 101}, {8, 21, 47, 62, 88, 101}, {8, 34, 47, 62, 75, 101}, and {21, 34, 47, 62, 75, 88} may be determined to be the position of pilot tones in the 108 tone-unit. The four sets may be represented as four sets, such as {1+a, 28−a, 27+a, 82−a, 81+a, 108−a}, {1+a, 28−a, 54−a, 55+a, 81+a, 108−a}, {1+a, 27+a, 54−a, 55+a, 82−a, 108−a}, and {28−a, 27+a, 54−a, 55+a, 82−a, 81+a}.

In addition, the value "a" optimized for the 108-tone-unit from a viewpoint of the equi-space may be determined. If the 108 tone-unit is divided by 6, that is, the number of pilots, it leads to 18. Accordingly, if a pilot is placed at the center of the 18 tone-units, that is, in the ninth or the tenth tone, performance may be the best from a viewpoint of the equi-space. A method for using the pilot tones of 1+a, 28−a (or 27+a), and 54−a and the pairs of the pilot tones from a viewpoint of a minimum distance is proposed. In this case, "1+a" needs to become a value close to 9 or 10, "28−a" needs to become a value close to 27, "27+a" needs to become a value close to 28, and "54−a" needs to become a value close to 45 or 46. That is, pilot positions having the best performance may be determined using the value "a" that satisfies Equation 5 below.

$$\min(abs(9-(1+a)), abs(10-(1+a))) + abs(27-(28-a)) + \min(abs(45-(54-a)), abs(46-(54-a))) \quad \text{[Equation 5]}$$

The value "a" that minimizes Equation 5 is determined to be 8, and also has a result close to 7. Accordingly, 7 or 8 is proposed as the value "a" by taking into consideration equi-space performance of the 26 tone-units and the 52 tone-units.

2) Position of Pilot Tones of 242 Tone-Unit

As described above, the position of pilot tones of the 26 tone-unit is {7, 20} (or {a, 27−a}). Accordingly, as shown in FIG. 20, eight of 8, 21, 34, 47, 62, 75, 88, 101, 115, 128, 142, 155, 168, 181, 196, 209, 222, and 235 (or 1+a, 28−a, 27+a, 54−a, 55+a, 82−a, 81+a, 108−a, 108+a, 135−a, 135+a, 162−a, 161+a, 188−a, 189+a, 216−a, 215+a, and 242−a) may be selected and used as the position of pilot tones in the 242 tone-unit. In this case, if 8 and 235, 21 and 222, 34 and 209, 47 and 196, 62 and 181, 75 and 168, 88 and 155, 101 and 142, and 115 and 128 (or 1+a and 242−a, 28−a and 215+a, 27+a and 216−a, 54−a and 189+a, 55+a and 188−a, 82−a and 161+a, 81+a and 162−a, 108−a and 135+a, and 108+a and 135−a) are used as pairs together, better performance in symmetry is obtained. The pairs may be represented as p1, p2, . . . , p9, respectively. All of cases which may be obtained when four of the 9 pairs are picked up without redundancy may be determined to be the position of pilot tones of the 242 tone-unit.

In addition, the value "a" optimized for the 242 tone-unit from a viewpoint of the equi-space may be determined. If the 242 tone-unit is divided by 8, that is, the number of pilots, it leads to about 30. It is assumed that the remaining two tones are placed at both ends. Accordingly, if a pilot is placed at the center of the 30 tone-units, that is, in the fifteenth or sixteenth tone, performance may be the best from a viewpoint of the equi-space. However, the first and the last are 31 tone blocks, and the pilot has only to be placed at the sixteenth tone of the block. A method for using the pilot tones of 28−a, 54−a, 82−a, and 108−a and the pairs of the pilot tones from a viewpoint of a minimum distance is proposed. In this case, "28−a" needs to become a value close to 16, "54−a" needs to become a value close to 46 or 47, "82−a" needs to become a value close to 76 or 77, and "108−a" needs to become a value close to 106 or 107. That is, pilot positions having the best performance may be determined using the value "a" that satisfies Equation 6.

$$abs(16-(28-a)) + \min(abs(46-(54-a)), abs(47-(54-a))) + \min(abs(76-(82-a)), abs(77-(82-a))) + \min(abs(106-(108-a)), abs(107-(108-a))) \quad \text{[Equation 6]}$$

The value "a" that minimizes Equation 6 is determined to be 6 or 7, and 7 is proposed as the value "a" by taking into consideration equi-space performance of the 26 tone-units, the 52 tone-units, and the 108 tone-units. In such an embodiment, the position of pilot tones may be determined to be {21, 47, 75, 101, 142, 168, 196, 222}.

FIG. 21 is a block diagram of each STA apparatus according to an embodiment of the present invention.

Referring to FIG. 21, the STA apparatus may include memory 21010, a processor 21020, and an RF unit 21030. Furthermore, as described above, the STA apparatus is an HE STA apparatus and may be an AP STA or a non-AP STA.

The RF unit 21030 is connected to the processor 21020 and may transmit/receive radio signals. The RF unit 21030 may up-convert data, received from the processor, into a transmission/reception band, and may transmit a signal.

The processor 21020 is connected to the RF unit 21030 and may implement the physical layer and/or the MAC layer according to the IEEE 802.11 system. The processor 21020 may be configured to perform operations according to various embodiments of the present invention based on the drawings and description. Furthermore, a module for implementing the operations of the STA according to the aforementioned various embodiments of the present invention may be stored in the memory 21010 and may be executed by the processor 21020.

The memory 21010 is connected to the processor 21020 and stores various pieces of information for driving the processor 21020. The memory 21010 may be included in the processor 21020 or may be installed outside the processor 21020 and may be connected to the processor 21020 by known means.

Furthermore, the STA apparatus may include a single antenna or multiple antennas. A detailed configuration of the STA apparatus of FIG. 21 may be implemented so that the contents described in the various embodiments of the present invention are independently applied or two or more of the various embodiments are applied at the same time.

FIG. 22 is a further detailed diagram of the STA apparatus according to an embodiment of the present invention.

Referring to FIG. 22, the STA apparatus includes a forward error correction (FCE) encoder 22010, a mapper 22020, a pilot insertion unit 22030, an IDFT unit 22040, and an analog/RF unit 22050. In FIG. 22, the FEC encoder 22010, the mapper 22020, the pilot insertion unit 22030, and the IDFT unit 22040 may be included in the processor 21020 of FIG. 22. The analog/RF unit 22050 may correspond to the RF unit 21030 of FIG. 22. The STA apparatus of FIG. 22 may perform the aforementioned operations of the HE STA.

The FCE encoder 22010 may encode data bits according to a predetermined coding method and output the coded data bits. In this case, the FEC encoder 22010 may be implemented using a convolutional encoder, a turbo encoder or a low density parity check (LDPC) encoder as an error correction coder. The FEC encoder 22010 may perform binary convolutional code (BCC) encoding as a convolutional encoder.

The mapper 22020 may perform constellation mapping. In other words, the mapper 22020 may modulate data bits according to a predetermined modulation method and output a modulation symbol (i.e., a constellation point). That is, coded data bits may be divided into bit blocks by the mapper 22020. Each of the bit blocks may be mapped to modulation symbols that represent a position according to a constellation point having amplitude and a phase. The modulation scheme of the mapper 22020 is not limited, and m-phase shift keying (m-PSK) or m-quardrature amplitude modulation (m-QAM) may be used as the modulation scheme.

The pilot insertion unit 22030 may insert a pilot into transmission data. In other words, the pilot insertion unit 22030 may insert pilot tones into subcarriers based on a number and position determined as described above in connection with the embodiments of FIGS. 14 to 20.

The IDFT unit 22040 may perform IDFT on data. In other words, the IDFT unit 22040 may perform IFFT or IDFT on modulation symbols output by the mapper 22020 and may output OFDM symbol data in a time domain.

The analog/RF unit 22050 may up-convert a complex baseband waveform and may transmit an RF signal. In other words, the analog/RF unit 22050 may up-convert data/signals processed in a baseband and may transmit a transmission signal, and may also be called an RF unit.

FIG. 23 is a flowchart illustrating a data transmission method of an STA according to an embodiment of the present invention.

Steps included in the flowchart of FIG. 23 are performed as described with reference to the STA apparatus of FIG. 22. The STA may FEC-encode transmission data using the FEC encoder at step S23010. Furthermore, the STA may constellation-map the transmission data using the mapper at step S23020. Furthermore, the STA may insert pilot tones into the transmission data using the pilot insertion unit at step S23030. Furthermore, the STA may IDFT- or IFFT-process the transmission data using the IDFT unit at step S23040. Furthermore, the STA may up-convert the transmission data using the analog/RF unit and transmit a transmission signal at step S23050.

In this specification, as described above, if the STA uses an OFDMA scheme, the STA may allocate a plurality of subcarriers included in the transmission signal to at least one user. In this case, the STA does not randomly allocate a plurality of subcarriers, but may allocate a plurality of subcarriers in a predetermined tone-unit unit by taking into consideration efficiency and performance of signal processing. More specifically, system complexity can be reduced using the number of tones of a legacy 802.11 system as the number of tones included in predetermined tone-units to a maximum extent. In order to secure sufficient subcarriers, the STA may use an FFT size that is four times greater than that of the legacy 802.11 system.

Tone-units, that is, a basis for allocating the subcarriers of the OFDMA scheme, include the 26 tone-unit, the 52 tone-unit, the 108 tone-unit, and the 242 tone-unit as described above. The STA may allocate subcarriers using at least one of the tone-units or a combination of the tone-units.

The number of pilot tones inserted into each tone-unit may be determined by taking into consideration compatibility with the legacy 802.11 system and system complexity. As described above, the 26 tone-unit may include two pilot tones, the 52 tone-unit may include four pilot tones, the 108 tone-unit may include six pilot tones, and the 242 tone-unit may include eight pilot tones.

Tone plans and the position of pilot tones are determined so that they satisfy the symmetry and equi-space of pilot tones included in a signal by taking into consideration system performance. The tone plans and the position of the pilot tones are the same as those described with reference to FIGS. 14 to 20. For example, if a 26 tone-unit is used for OFDMA, the STA may insert a pilot tone into the seventh tone and twentieth tone of the 26 tone-unit. For another example, if a 52 tone-unit is used, the STA may insert a pilot tone into the seventh tone, twentieth tone, thirty-third tone, and forty-sixth tone of the 52 tone-unit. In the case of a tone plan, a 52 tone-unit may include two 26 tone-units, a 108 tone-unit may include two 52 tone-units and four leftover tones, and the position of the 52 tone-units and leftover tones is the same as that described above. A 242 tone-unit may include one 26 tone-unit and four 52 tone-units. In this case, the 26-tone-unit may be disposed at the center, and two 52 tone-units may be disposed on both sides of the 26-tone-unit, respectively.

Those skilled in the art will understand that the present invention may be changed and modified in various ways without departing from the spirit or range of the present invention. Accordingly, the present invention is intended to include all the changes and modifications provided by the appended claims and equivalents thereof.

In this specification, both the apparatus and the method have been described, and the descriptions of both the apparatus and method may be mutually supplemented and applied.

Various embodiments have been described in an exemplary form for implementing the present invention.

INDUSTRIAL APPLICABILITY

Although the data transmission/reception methods in wireless communication systems according to the embodiments of the present invention have been described based on an example in which the methods are applied to the IEEE 802.11 systems, they may also be applied to various wireless communication systems in addition to the IEEE 802.11 systems.

The invention claimed is:
1. A data transmission method of a station (STA) apparatus in a wireless local area network (WLAN) system, the method comprising:
   transmitting a transmission signal to an access point (AP) based on an orthogonal frequency division multiple access (OFDMA) scheme,
   wherein the transmission signal comprises at least one resource-unit which is a basis for subcarrier allocation of the OFDMA scheme,
   wherein each of the at least one resource-unit comprises a plurality of pilot subcarriers,
   wherein positions of the plurality of pilot subcarriers are symmetrical with respect to a center frequency of the transmission signal, and
   wherein the plurality of pilot subcarriers are equally spaced with each other.

2. The data transmission method of claim 1,
   wherein a type of the at least one resource-unit is defined by a number of different subcarriers, and
   wherein the at least one resource-unit corresponds to a first resource-unit having 26 subcarriers, a second resource-unit comprising 2 first resource-units, a third resource-unit comprising 4 first resource-units or a fourth resource-unit comprising 9 first resource-units.

3. The data transmission method of claim 2, further comprising:
   determining the positions of the plurality of pilot subcarriers in each of the at least one resource-unit,
   wherein the positions of the plurality of pilot subcarriers in each of the at least one resource-unit are aligned with positions of a plurality of pilot subcarriers in each of a plurality of basic units, and
   wherein positions of the plurality of pilot subcarriers of the second resource-unit, the third resource-unit, or the fourth resource-unit are aligned with positions of the plurality of pilot subcarriers of the first resource-units.

4. The data transmission method of claim 3, wherein position indices of the pilot subcarriers of the second resource-units are the same as position indices of the pilot subcarriers of the first resource-units.

5. The data transmission method of claim 4, wherein position indices of the pilot subcarriers of the third resource-unit and the fourth resource-unit are the same as position indices of the pilot subcarriers which are selected from the pilot subcarriers of the first resource-units.

6. The data transmission method of claim 4, wherein the second resource-unit comprises 4 pilot subcarriers and position indices of the 4 pilot subcarriers are the same as position indices of 4 pilot subcarriers of the 2 first resource-units.

7. A station (STA) apparatus in a wireless local area network (WLAN) system, comprising:
- a transceiver for transmitting and receiving a radio signal; and
- a processor controlling the transceiver,
- wherein the processor is configured to transmit a transmission signal to an access point (AP) based on an orthogonal frequency division multiple access (OFDMA) scheme,
- wherein the transmission signal comprises at least one resource-unit which is a basis for subcarrier allocation of the OFDMA scheme,
- wherein each of the at least one resource-unit comprises a plurality of pilot subcarriers,
- wherein positions of plurality of the pilot subcarriers are symmetrical with respect to a center frequency of the transmission signal, and
- wherein the plurality of the pilot subcarriers are equally spaced with each other.

8. The STA apparatus of claim 7,
- wherein a type of the at least one resource-unit is defined by a number of different subcarriers, and
- wherein the at least one resource-unit corresponds to a first resource-unit having 26 subcarriers, a second resource-unit comprising 2 first resource-units, a third resource-unit comprising 4 first resource-units or a fourth resource-unit comprising 9 first resource-units.

9. The STA apparatus of claim 8,
- wherein the processor is configured to determine the positions of the plurality of pilot subcarriers in each of the at least one resource-unit,
- wherein the positions of the plurality of pilot subcarriers in each of the at least one resource-unit are aligned with positions of a plurality of pilot subcarriers in each of a plurality of basic units,
- wherein the positions of the plurality of pilot subcarriers of the second resource-unit, the third resource-unit, or the fourth resource-unit are aligned with positions of the plurality of pilot subcarriers of the first resource-units.

10. The STA apparatus of claim 9, wherein position indices of the pilot subcarriers of the second resource-units are the same as position indices of the pilot subcarriers of the first resource-units.

11. The STA apparatus of claim 10, wherein position indices of the pilot subcarriers of the third resource-unit and the fourth resource-unit are the same as position indices of the pilot subcarriers which are selected from the pilot subcarriers of the first resource-units.

12. The STA apparatus of claim 10 wherein the second resource-unit comprises 4 pilot subcarriers and position indices of the 4 pilot subcarriers are the same as position indices of 4 pilot subcarriers of the 2 first resource-units.

* * * * *